United States Patent
Saito et al.

(10) Patent No.: US 6,963,933 B2
(45) Date of Patent: Nov. 8, 2005

(54) DATA TRANSFER CONTROL DEVICE, ELECTRONIC EQUIPMENT, AND POWER SUPPLY SWITCHING METHOD

(75) Inventors: Nobuyuki Saito, Sapporo (JP); Shun Oshita, Sapporo (JP); Kenyou Nagao, Sapporo (JP)

(73) Assignee: Seiko Epson Corporation, Tokyo (JP)

( * ) Notice: Subject to any disclaimer, the term of this patent is extended or adjusted under 35 U.S.C. 154(b) by 217 days.

(21) Appl. No.: 10/379,592

(22) Filed: Mar. 6, 2003

(65) Prior Publication Data

US 2004/0042138 A1 Mar. 4, 2004

(30) Foreign Application Priority Data

Aug. 30, 2002 (JP) ........................................ 2002-253382

(51) Int. Cl.⁷ ............................................ G06F 13/00
(52) U.S. Cl. ............................. 710/1; 710/305; 710/33; 713/300
(58) Field of Search ....................... 710/1, 33, 100, 710/105–106, 305–316; 713/300–340; 455/557; 361/90

(56) References Cited

U.S. PATENT DOCUMENTS

| | | | | |
|---|---|---|---|---|
| 6,151,652 A | * | 11/2000 | Kondo et al. | 713/300 |
| 6,178,514 B1 | * | 1/2001 | Wood | 713/300 |
| 6,289,397 B1 | * | 9/2001 | Tsuyuguchi et al. | 710/1 |
| 6,415,342 B1 | * | 7/2002 | Wahl et al. | 710/100 |
| 6,531,998 B1 | * | 3/2003 | Gordon | 345/156 |
| 6,625,738 B1 | * | 9/2003 | Shiga | 713/310 |
| 6,662,301 B1 | * | 12/2003 | Sekine et al. | 713/320 |
| 6,671,814 B1 | * | 12/2003 | Kubo et al. | 713/324 |
| 6,715,071 B2 | * | 3/2004 | Ono et al. | 713/100 |
| 6,731,924 B2 | * | 5/2004 | Gushiken | 455/343.1 |

FOREIGN PATENT DOCUMENTS

JP    A-2001-339850    12/2001

OTHER PUBLICATIONS

U.S. patent application Ser. No. 10/376,548, Saito et al., filed Mar. 4, 2003.
Nobuyuki Saito; "OTG Controller LSI Taking Reduction of CPU Load into Consideration"; Design Wave Magazine; Apr. 2002; pp 82–88 and 166 w/English abstract.

* cited by examiner

Primary Examiner—Christopher B. Shin
(74) Attorney, Agent, or Firm—Oliff & Berridge PLC

(57) ABSTRACT

A state controller of a data transfer processing circuit switches an operation of an A-device or a B-device between a host operation and a peripheral operation by state transition. A power supply switch circuit connects a power supply circuit with a VBUS line based on transition of the state controller. A power supply switching circuit of a power supply control circuit connects the VBUS line or the power supply circuit with the data transfer processing circuit based on a switching signal. The switching signal is generated based on an output signal of a switch circuit or a control signal from the state controller.

21 Claims, 14 Drawing Sheets

FIG. 1A
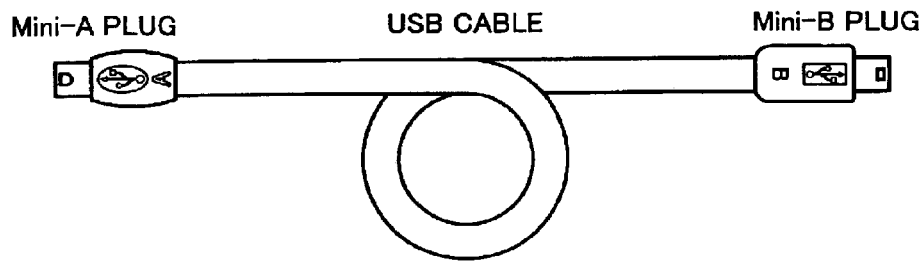
FIG. 1B
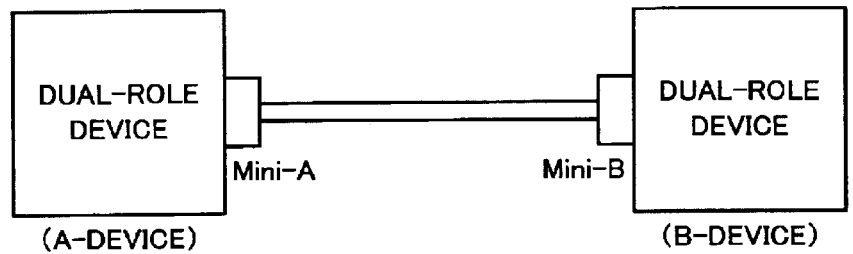
FIG. 1C
| TERMINAL NUMBER | SIGNAL NAME |
|---|---|
| 1 | VBUS |
| 2 | D− |
| 3 | D+ |
| 4 | ID |
| 5 | GND |

DATA TRANSFER CONTROL DEVICE, ELECTRONIC EQUIPMENT, AND POWER SUPPLY SWITCHING METHOD

Japanese Patent Application No. 2002-253382 filed on Aug. 30, 2002, is hereby incorporated by reference in its entirety.

BACKGROUND OF THE INVENTION

The present invention relates to a data transfer control device, electronic equipment, and a power supply switching method.

In recent years, the Universal Serial Bus (USB) standard has attracted attention as an interface standard for connecting a personal computer with a peripheral device (electronic equipment in a broad sense). However, data transfer according to the USB standard cannot be performed between peripheral devices without an intermediate host. Therefore, the "USB On-The-Go (OTG) 1.0" standard (hereinafter abbreviated as "OTG standard") has been provided as a supplemental standard to the USB 2.0 standard, and has enabled data transfer according to the USB standard to be performed between peripheral devices.

In the OTG standard, a peripheral which operates as a device in the USB standard is allowed to have a host function necessary for operating as a host. This enables peripheral devices, which are devices in the conventional USB standard, to be connected, whereby data can be transferred without an intermediate host in the conventional USB standard.

BRIEF SUMMARY OF THE INVENTION

One aspect of the present invention relates to a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the data transfer control device comprising:

a power supply circuit;

a power supply switch circuit which connects the power supply line with the power supply circuit when the data transfer control device operates as the first device;

a data transfer processing circuit which transfers data through the data lines; and a power supply switching circuit which provides power to the data transfer processing circuit from one of the power supply line and the power supply circuit based on a given switching signal.

Another aspect of the present invention relates to a data transfer control device which controls data transfer according to the Universal Serial Bus (USB) On-The-Go (OTG) standard, the data transfer control device comprising:

a power supply circuit;

a power supply switch circuit which connects a VBUS line with the power supply circuit when the data transfer control device operates as an A-device;

a data transfer processing circuit which transfers data through data lines; and a power supply switching circuit which provides power to the data transfer processing circuit from one of the VBUS line and the power supply circuit based on a given switching signal, wherein the power supply switching circuit provides power to the data transfer processing circuit from the VBUS line when the data transfer control device operates as a B-device and voltage of the VBUS line is detected to be larger than a first threshold value in an idle state.

A further aspect of the present invention relates to a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the data transfer control device comprising:

a power supply circuit;

a power supply switch circuit which connects the power supply line with the power supply circuit when the data transfer control device operates as the first device;

a data transfer processing circuit which transfers data through the data lines;

a power supply line voltage detection circuit which detects whether or not voltage of the power supply line is larger than a second threshold value; and a power supply switching circuit which provides power to the data transfer processing circuit from one of the power supply line and the power supply circuit based on a given switching signal, wherein the power supply switching circuit provides power to the data transfer processing circuit from the power supply line when the data transfer control device operates as the second device and the voltage of the power supply line is detected to be larger than a first threshold value which is lower than the second threshold value, and provides power to the data transfer processing circuit from the power supply circuit when the voltage of the power supply line that has been larger than the second threshold value drops and then is detected to be equal to or smaller than the second threshold value.

A still further aspect of the present invention relates to a data transfer control device which controls data transfer according to the Universal Serial Bus (USB) On-The-Go (OTG) standard, the data transfer control device comprising:

a power supply switch circuit which connects a VBUS line with a power supply circuit when the data transfer control device operates as an A-device;

a data transfer processing circuit which transfers data through data lines;

a power supply line voltage detection circuit which detects whether or not voltage of the VBUS line is larger than a second threshold value; and a power supply switching circuit which provides power to the data transfer processing circuit from one of the VBUS line and the power supply circuit based on a given switching signal, wherein the power supply switching circuit provides power to the data transfer processing circuit from the VBUS line when the data transfer control device operates as a B-device and the voltage of the VBUS line is detected to be larger than a first threshold value which is lower than the second threshold value, and provides power to the data transfer processing circuit from the power supply circuit when the voltage of the VBUS line that has been larger than the second threshold voltage drops and then is detected to be equal to or smaller than the second threshold value.

BRIEF DESCRIPTION OF THE SEVERAL VIEWS OF THE DRAWING

FIG. 1A is a schematic view showing an outline of a USB cable having a Mini-A plug and a Mini-B plug; FIG. 1B is illustrative of an A-device and a B-device; and FIG. 1C shows a terminal table.

DETAILED DESCRIPTION OF THE EMBODIMENT

Figure 2:
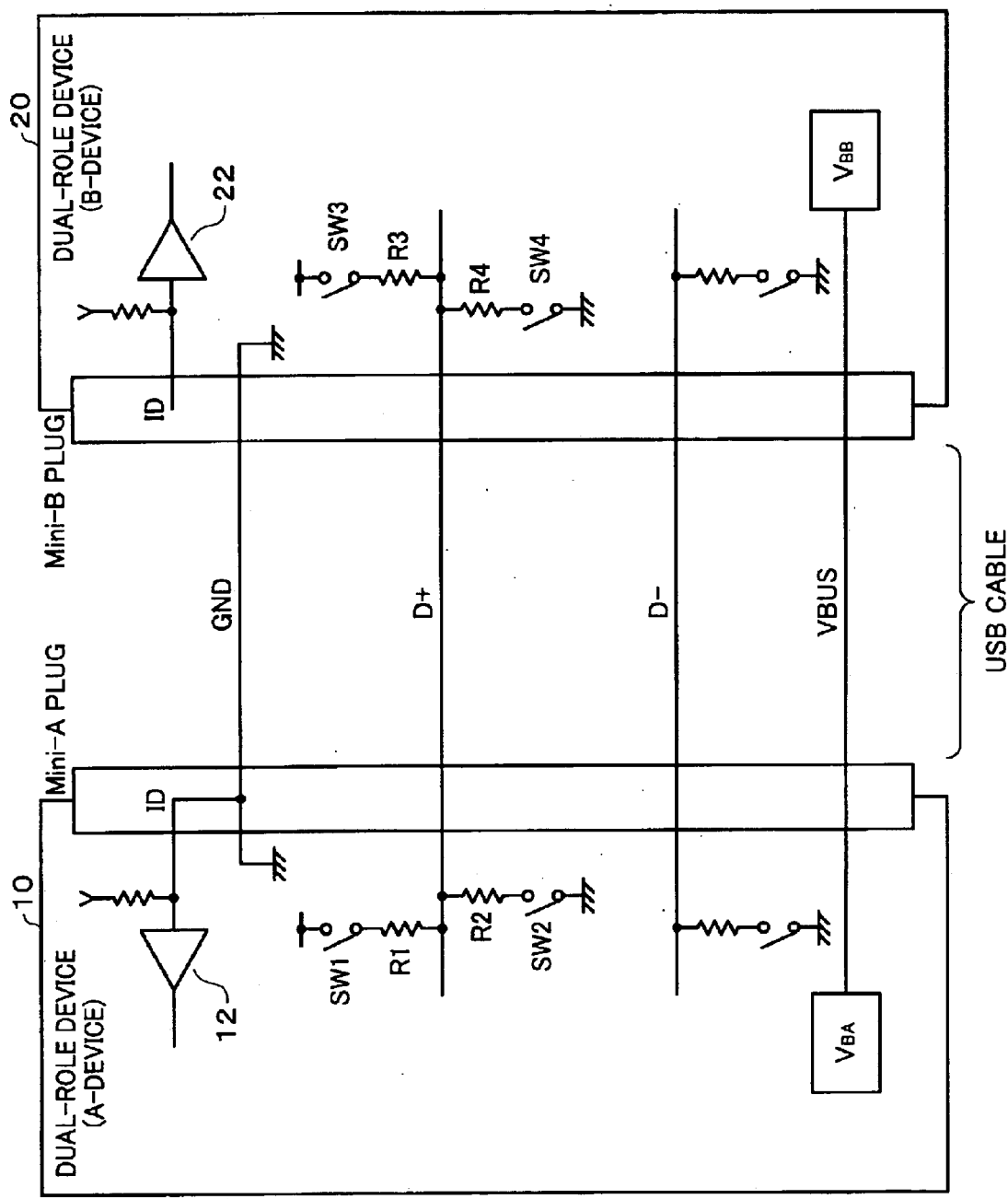
FIG. 2 schematically shows an example of dual-role devices to which a USB cable is connected.

Embodiments of the present invention are described below. Note that the embodiments described hereunder do not in any way limit the scope of the invention defined by the claims laid out herein. Note also that all of the elements to be described hereunder should not be taken as essential requirements for the present invention.

The OTG standard defines a dual-role device and a peripheral-only device. The dual-role device can operate as both a host and a peripheral. The peripheral-only device can operate only as a peripheral.

In the OTG standard, the power supply line may not be driven when a device which is operating as a host does not use the bus in order to reduce power consumption. Therefore, for example, a device which is operating as a peripheral can use the unused bus by requesting the device which is operating as a host to allow the device which is operating as a peripheral to use the bus according to a procedure called SRP (Session Request Protocol). According to SRP, the device which is operating as a peripheral requests the device which is operating as a host to provide power to the VBUS line by using a technique called data-line pulsing or VBUS (power supply bus) pulsing. Therefore, a device conforming to the OTG standard must have a self-power supply in order to initiate SRP.

A case where a device conforming to the OTG standard (OTG device) is connected with a standard host conforming to the USB standard (personal computer, for example) is described below. In the USB standard, the standard host must provide power to the VBUS line. However, since the OTG device has a self-power supply, the OTG device operates by consuming electric power from its own power supply even though the standard host always provides power to the VBUS line, whereby unnecessary electric power is consumed. In particular, in the case where the OTG device is portable information equipment, the battery life is decreased.

According to the following embodiments, a data transfer control device, electronic equipment, and a power supply switching method capable of reducing unnecessary power consumption in the case of transferring data between peripheral devices of the OTG standard, for example, can be provided.

One embodiment of the present invention relates to a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the data transfer control device comprising:

a power supply circuit;

a power supply switch circuit which connects the power supply line with the power supply circuit when the data transfer control device operates as the first device;

a data transfer processing circuit which transfers data through the data lines; and a power supply switching circuit which provides power to the data transfer processing circuit from one of the power supply line and the power supply circuit based on a given switching signal.

In this data transfer control device in which power is provided to the power supply line by the power supply switch circuit when the data transfer control device operates as the first device, power can be provided to the data transfer processing circuit by allowing the power supply switching circuit to switch the power source from the power supply circuit to the power supply line. Therefore, since the data processing circuit can be operated by providing power from the power supply line when the data transfer control device operates as the second device, power consumption by the power supply circuit can be reduced.

This data transfer control device may comprise a switch circuit which turns on or off the given switching signal, and the given switching signal may be generated based on output of the switch circuit.

According to this data transfer control device, since the power supply source can be appropriately switched by the switch circuit, power consumption by the data transfer control device can be optimized.

Another embodiment of the present invention relates to a data transfer control device which controls data transfer according to the Universal Serial Bus (USB) On-The-Go (OTG) standard, the data transfer control device comprising:

a power supply circuit;

a power supply switch circuit which connects a VBUS line with the power supply circuit when the data transfer control device operates as an A-device;

a data transfer processing circuit which transfers data through data lines; and a power supply switching circuit which provides power to the data transfer processing circuit from one of the VBUS line and the power supply circuit based on a given switching signal, wherein the power supply switching circuit provides power to the data transfer processing circuit from the VBUS line when the data transfer control device operates as a B-device and voltage of the VBUS line is detected to be larger than a first threshold value in an idle state.

A data transfer control device conforming to the OTG standard must have a self-power supply. Therefore, the data transfer control device consumes electric power from its own power supply circuit even if power is provided to the VBUS line from a standard host, for example.

According to this data transfer control device, since the data processing circuit can be operated by using a bus power supply by allowing the power supply switching circuit to provide power to the data processing circuit from the power supply line, unnecessary power consumption by the power supply circuit, which is provided as a self-power supply, can be reduced. Moreover, since the power supply switching circuit can be operated by the results of state transition, switching of the power supply can be optimized without providing a large-scale additional circuit.

A further embodiment of the present invention relates to a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the data transfer control device comprising:

a power supply circuit;

a power supply switch circuit which connects the power supply line with the power supply circuit when the data transfer control device operates as the first device;

a data transfer processing circuit which transfers data through the data lines;

a power supply line voltage detection circuit which detects whether or not voltage of the power supply line is larger than a second threshold value; and a power supply switching circuit which provides power to the data transfer processing circuit from one of the power supply line and the power supply circuit based on a given switching signal, wherein the power supply switching circuit provides power to the data transfer processing circuit from the power supply line when the data transfer control device operates as the second device and the voltage of the power supply line is detected to be larger than a first threshold value which is lower than the second threshold value, and provides power to the data transfer processing circuit from the power supply circuit when the voltage of the power supply line that has been larger than the second threshold value drops and then is detected to be equal to or smaller than the second threshold value.

A still further embodiment of the present invention relates to a data transfer control device which controls data transfer according to the Universal Serial Bus (USB) On-The-Go (OTG) standard, the data transfer control device comprising:

a power supply circuit;

a power supply switch circuit which connects a VBUS line with the power supply circuit when the data transfer control device operates as an A-device;

a data transfer processing circuit which transfers data through data lines;

a power supply line voltage detection circuit which detects whether or not voltage of the VBUS line is larger than a second threshold value; and a power supply switching circuit which provides power to the data transfer processing circuit from one of the VBUS line and the power supply circuit based on a given switching signal, wherein the power supply switching circuit provides power to the data transfer processing circuit from the VBUS line when the data transfer control device operates as a B-device and the voltage of the VBUS line is detected to be larger than a first threshold value which is lower than the second threshold value, and provides power to the data transfer processing circuit from the power supply circuit when the voltage of the VBUS line that has been larger than the second threshold voltage drops and then is detected to be equal to or smaller than the second threshold value.

According to this data transfer control device, even in the case where the bus power supply source cannot provide power for some reason after switching from the self-power supply to the bus power supply, the power supply can be switched to the self-power supply by the power supply switching circuit by monitoring the power supply line (VBUS line). Therefore, reliability of the data transfer control device capable of reducing power consumption by switching the power supply can be improved. Moreover, both reduction of power consumption and improvement of reliability of the data transfer control device conforming to the OTG standard can be achieved.

In this data transfer control device, switching of a power source provided to the data transfer processing circuit from the power supply circuit to the VBUS line may be performed after a state transition of the B-device from an idle state to a peripheral state, and switching of a power source provided to the data transfer processing circuit from the VBUS line to the power supply circuit may be performed before a state transition of the B-device from the peripheral state to the idle state.

According to this data transfer control device, since it suffices to merely monitor the voltage of the VBUS line in the idle state of the B-device, control by means of state management can be simplified.

In this data transfer control device, the second threshold value may be higher than a session valid threshold value of the B-device and lower than a VBUS valid threshold value of the A-device.

According to this data transfer control device, since the voltage of the VBUS line can be monitored in the idle state of the B-device by merely setting the second threshold value, the configuration and control can be simplified.

Electronic equipment according to a still further embodiment of the present invention may comprise:

the above data transfer control device; and a device which performs output processing, fetch processing, or storage processing of data transferred through the data transfer processing circuit and a bus.

According to the embodiment of the present invention, electronic equipment capable of reducing unnecessary power consumption by switching the power supply to the bus power supply, even if a data transfer control device which operates by using a self-power supply is equipped therewith, can be provided.

A still further embodiment of the present invention relates to a power supply switching method for a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the power supply switching method comprising:

detecting whether or not voltage of the power supply line is larger than a first threshold value in an idle state when the data transfer control device operates as the second device in a state in which power is provided to a data transfer processing circuit from a power supply circuit, the data transfer processing circuit transferring data through the data lines, and the power supply circuit being connected with the power supply line when the data transfer control device operates as the first device; and providing power to the data transfer processing circuit from the power supply line when the data transfer control device operates as the second device and the voltage of the power supply line is detected to be larger than the first threshold value in the idle state.

A still further embodiment of the present invention relates to a power supply switching method for a data transfer control device which controls data transfer according to the Universal Serial Bus (USB) On-The-Go (OTG) standard, the power supply switching method comprising:

detecting whether or not voltage of a VBUS line is larger than a first threshold value in an idle state when the data transfer control device operates as a B-device in a state in which power is provided to a data transfer processing circuit from a power supply circuit, the data transfer processing circuit transferring data through data lines, and the power supply circuit being connected with the VBUS line when the data transfer control device operates as an A-device; and providing power to the data transfer processing circuit from the VBUS line when the data transfer control device operates as a B-device and voltage of the VBUS line is detected to be larger than the first threshold value in an idle state.

An even further embodiment of the present invention relates to a power supply switching method for a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the power supply switching method comprising:

providing power to a data transfer processing circuit from the power supply line when the data transfer control device operates as the second device and the voltage of the power supply line is detected to be larger than a first threshold value in the idle state, in a state in which power is provided to the data transfer processing circuit from a power supply circuit, the data transfer processing circuit transferring data through the data lines, and the power supply circuit being connected with the power supply line when the data transfer control device operates as the first device; and providing power to the data transfer processing circuit from the power supply circuit when the voltage of the power supply line is detected to be equal to or smaller than a second threshold value, in a state in which power is provided to the data transfer processing circuit from the power supply line.

A yet further embodiment of the present invention relates to a power supply switching method for a data transfer control device which controls data transfer according to the Universal Serial Bus (USB) On-The-Go (OTG) standard, the power supply switching method comprising:

providing power to a data transfer processing circuit from the VBUS line when voltage of a VBUS line is detected to be larger than a first threshold value in an idle state when the data transfer control device operates as a B-device in a state in which power is provided to the data transfer processing circuit from a power supply circuit, the data transfer processing circuit transferring data through data lines, and the power supply circuit being connected with the VBUS line when the data transfer control device operates as an A-device; and providing power to the data transfer processing circuit from the power supply circuit when the voltage of the VBUS line is detected to be equal to or smaller than a second threshold value in a state in which power is provided to the data transfer processing circuit from the VBUS line.

This power supply switching method may further comprise:

performing switching of a power source provided to the data transfer processing circuit from the power supply circuit to the VBUS line after a state transition of the B-device from an idle state to a peripheral state, and performing switching of a power source provided to the data transfer processing circuit from the VBUS line to the power supply circuit before a state transition of the B-device from the peripheral state to the idle state.

This power supply switching method may further comprise setting the first threshold value lower than the second threshold value.

In this power supply switching method, the second threshold value may be higher than a session valid threshold value of the B-device and lower than a VBUS valid threshold value of the A-device.

The embodiments of the present invention are described below in detail with reference to the drawings.

1. On-The-Go (OTG) Standard 1.1 A-device and B-device

The OTG standard is briefly described below.

The Universal Serial Bus (USB) standard is a standard for transferring data between a host (personal computer, for example) and one or more peripherals (peripheral devices, for example). Data transfer is controlled by the host. The amount of data processed in portable equipment and the like which are peripherals in the USB standard has been increased. Therefore, a demand for transferring data according to the USB standard without an intermediate host while consuming only a small amount of power has been increased.

In view of such a situation, the OTG standard has been provided as a supplemental standard to the USB 2.0 standard. In the OTG standard, small-sized connectors, a dual-role device which allows a peripheral to have a host function necessary for operating as a host, and the like are newly standardized.

In the case of transferring data according to the OTG standard, a host is connected with a peripheral by a USB cable to which a Mini-A plug and a Mini-B plug are provided on opposite ends, as shown in FIG. 1A. The Mini-A plug has a structure which allows insertion into a Mini-A receptacle or a Mini-AB receptacle. The Mini-B plug has a structure which allows insertion into a Mini-B receptacle or a Mini-AB receptacle. A dual-role device must be equipped with a Mini-AB receptacle.

In the USB standard, a host can be connected with a peripheral only by using a VBUS (power supply bus) line, GND (ground), and two data signal lines (D+ and D−). A power supply (electric power; power supply current in more detail) is supplied the VBUS line from the host. The data signal lines (data lines) D+ and D− are used as differential signal lines.

In the OTG standard, a dual-role device to which a Mini-A plug is connected becomes an A-device (first device in a broad sense), as shown in FIG. 1B. The A-device operates as the host at the start of a session and is capable of transferring the host function to a B-device under given conditions. A dual-role device to which a Mini-B plug is connected becomes a B-device (second device in a broad sense). The B-device operates as the peripheral at the start of a session and is allowed to operate as the host by the A-device. A power supply is supplied to the VBUS line by the A-device. The A-device controls data transfer by using a self-power supply in the default state. The B-device controls data transfer by using a bus power supply in the default state.

In the dual-role device, an ID terminal is defined in addition to the conventional terminals (VBUS, D−, D+, and GND) of the connector in order to detect the type of plug inserted into the Mini-AB receptacle, as shown in FIG. 1C. The ID terminal is connected with GND in the Mini-A plug and the ID terminal is in an open state in the Mini-B plug.

FIG. 2 schematically shows an example of dual-role devices to which a USB cable is connected.

A dual-role device 10 to which a Mini-A plug is connected and a dual-role device 20 to which a Mini-B plug is connected are connected through a USB cable. The dual-role devices 10 and 20 include ID detection circuits 12 and 22, respectively. Each of the ID detection circuits 12 and 22 pulls up a signal line electrically connected with the ID terminal and detects whether or not the ID terminal is grounded depending on the voltage of the signal line. The ID detection circuit 12 shown in FIG. 2 detects a Mini-A plug since the signal line connected with the ID terminal is grounded. The ID detection circuit 22 detects a Mini-B plug since the signal line connected with the ID terminal is pulled up.

The dual-role device 10 includes a pull-up resistor R1 for pulling up the data signal line D+ and a pull-down resistor R2 for pulling down the data signal line D+ in order to operate as the host or the peripheral. The pull-up resistor R1 is connected with a power supply voltage line through a switch circuit SW1 for turning the pull-up on/off. The pull-down resistor R2 is connected with a ground line through a switch circuit SW2 for turning the pull-down on/off. The switch circuits SW1 and SW2 are controlled exclusively so that one of the switch circuits SW1 and SW2 is turned off when the other is turned on.

The dual-role device 20 includes a pull-up resistor R3 for pulling up the data signal line D+ and a pull-down resistor R4 for pulling down the data signal line D+. The pull-up resistor R3 is connected with a power supply voltage line through a switch circuit SW3 for turning the pull-up on/off. The pull-down resistor R4 is connected with a ground line through a switch circuit SW4 for turning the pull-down on/off. The switch circuits SW3 and SW4 are controlled exclusively so that one of the switch circuits SW3 and SW4 is turned off when the other is turned on.

In the dual-role devices 10 and 20, the data signal line D− is pulled low.

Since both the dual-role devices 10 and 20 can become the A-device, the dual-role devices 10 and 20 respectively include power supply control circuits VBA and VBB which supply current to VBUS. In FIG. 2, the dual-role device 10 supplies current to the VBUS line by the power supply control circuit VBA.

1.2 Session Request Protocol (SRP)

In the OTG standard, the A-device can suspend supply of current to the VBUS line when there is no bus activity. Therefore, unnecessary power consumption can be reduced if battery-powered portable equipment operates as the host, whereby power consumption can be reduced. In the case where the B-device starts a session in this state and transfers data, the B-device can request the A-device to supply current to the VBUS line according to the procedure called SRP. The session used herein refers to a period in which the voltage of the VBUS line is above a given threshold voltage.

Figure 3:
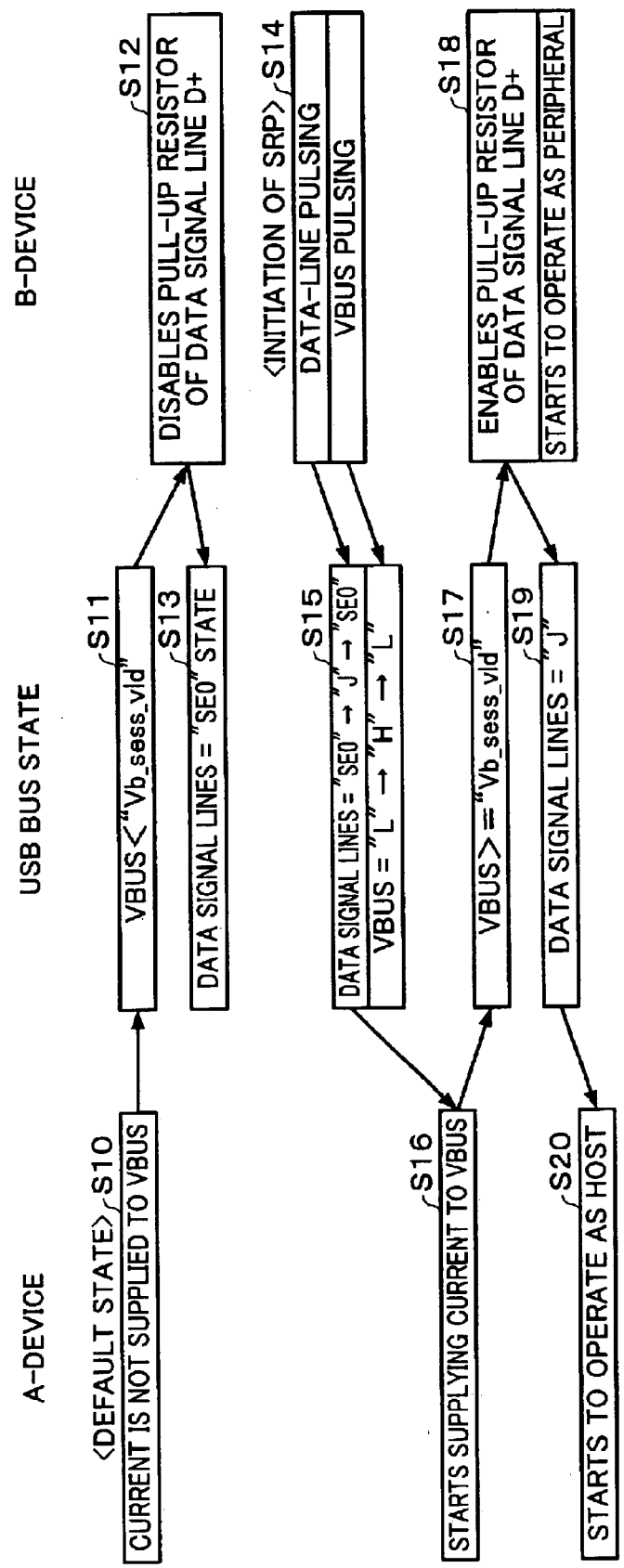
FIG. 3 is a view illustrating SRP.

FIG. 3 is a view illustrating the procedure for SRP in the FS (Full Speed) mode with reference to the configuration of the dual-role devices shown in FIG. 2.

In the FS mode, the data signal line D+ is pulled down in the host (switch circuit SW1 is turned off and switch circuit SW2 is turned on), and the data signal line D+ is pulled up in the peripheral (switch circuit SW3 is turned on and switch circuit SW4 is turned off).

When there is no bus activity and the A-device suspends supply of current to the VBUS line (S10), the voltage of the VBUS line drops below a "Vb_sess_vld" (B-DeviceSession Valid) level (S11). When the B-device detects that the voltage of the VBUS line drops below the "Vb_sess_vld" level, the B-device disables the pull-up resistor of the data signal line D+ by the switch circuit SW3 (S12). This allows the line state of the data signal lines to be in an "SE0" state (data signal line D+ is at "L" level and data signal line D− is at "L" level in the FS mode) (S13).

If the voltage of the VBUS line is lower than "Vb_sess_end" (B-Device Session End) and the "SE0" state continues for 2 ms or more, the B-device can initiate SRP. SRP can be performed by data-line pulsing or VBUS pulsing. The data-line pulsing is a method which causes the line state to transition to the "SE0" state, a "J" state (data signal line D+ is at "H" level and data signal line D is at "L" level in the FS mode), and the "SE0" state in that order. The VBUS pulsing is a method which causes the voltage of the VBUS line to transition to an "L" level (less than Vb_sess_end), an "H" level (higher than Va_sess_vld), and the "L" level in that order by allowing the B-device to supply current to the VBUS line (S14 and S15).

When the A-device detects that SRP is performed by either method by monitoring the voltages of the data signal lines or voltage of the VBUS line, the A-device starts supplying current to the VBUS line (S16). This allows the voltage of the VBUS line to be equal to or above "Vb_sess_vld" (S17).

When the B-device detects that the voltage of the VBUS line is equal to or above "Vb_sess_vld", the B-device enables the pull-up resistor of the data signal line D+ by the switch circuit SW3 (S18) to allow the line state to transition to the "J" state (S19), and starts to operate as the peripheral.

When the A-device detects that the line state is in the "J" state, the A-device starts to operate as the host (S20).

1.3 Host Negotiation Protocol (HNP)

In the OTG standard, a dual-role device becomes either the A-device or the B-device depending on the plug connected thereto. However, the host function and the peripheral function can be exchanged without plugging or unplugging. HNP is a procedure for exchanging the host function and the peripheral function.

Figure 4:
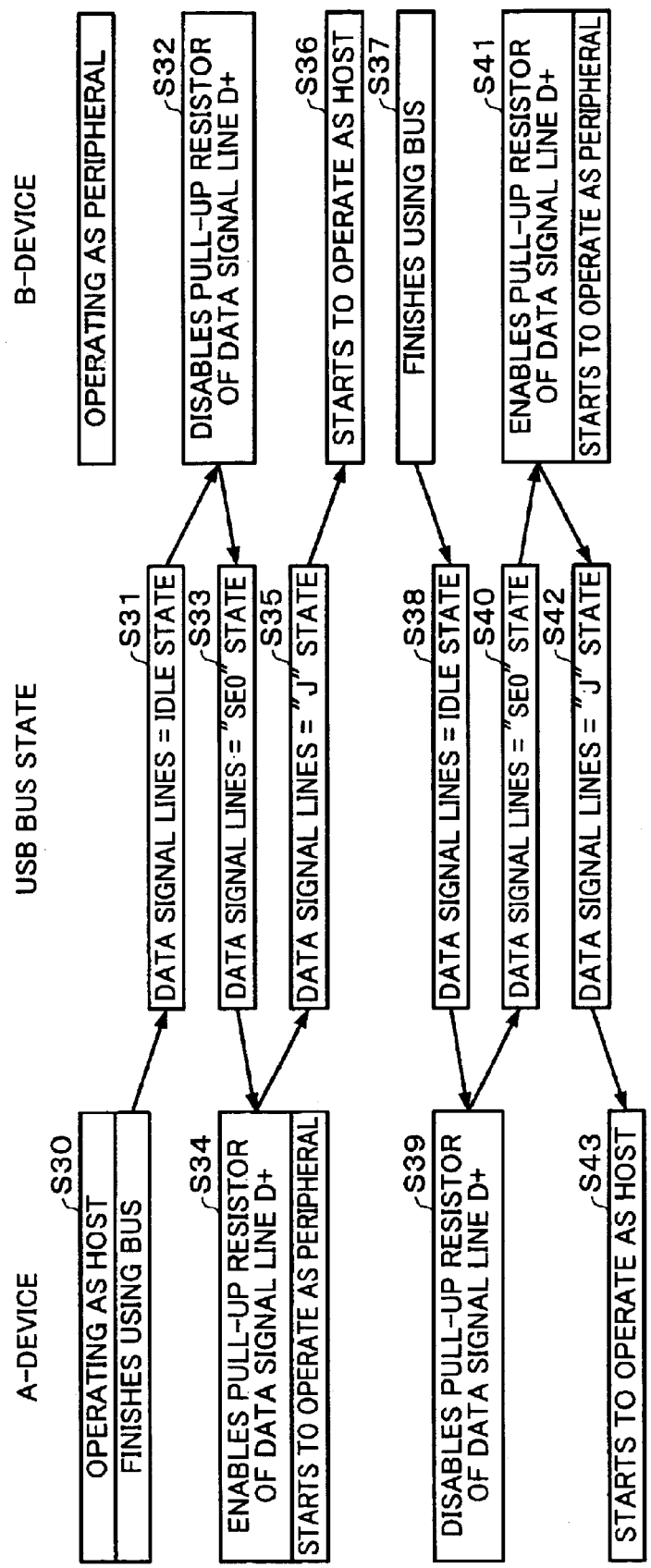
FIG. 4 is a view illustrating HNP.

FIG. 4 is a view illustrating the procedure for HNP in the FS mode with reference to the configuration of the dual-role devices shown in FIG. 2.

The following description is given on the assumption that the A-device operates as the host, the B-device operates as the peripheral, and HNP is enabled.

When the A-device finishes using the bus (S30), the A-device puts the line state in an idle state ("J" state in the FS mode) (S31).

When the B-device detects that the "J" state continues for 3 ms or more, the B-device disables the pull-up resistor of the data signal line D+ by the switch circuit SW3 (S32) to allow the line state to be in the "SE0" state (S33). When the A-device detects that the line state is in the "SE0" state, the A-device enables the pull-up resistor (disables the pull-down resistor) of the data signal line D+ by the switch circuit SW1 (S34). This allows the line state to be in the "J" state (S35), whereby the A-device starts to operate as the peripheral. The B-device detects that the line state is in the "J" state and starts to operate as the host (S36).

When the B-device as the host finishes using the bus (S37), the B-device allows the line state to be in the idle state by the switch circuits SW3 and SW4 (S38). The A-device detects that the line state is in the idle state and disables the pull-up resistor of the data signal line D+ (S39) to allow the line state to transition to the "SE0" state (S40). When the B-device detects that the line state is in the "SE0" state, the B-device enables the pull-up resistor (disables the pull-down resistor) of the data signal line D+ by the switch circuit SW3 (S41). This allows the line state to be in the "J" state (S42), whereby the B-device starts to operate as the peripheral. The A-device detects that the line state is in the "J" state and starts to operate as the host (S43).

Data transfer control by using such a protocol can be realized by allowing the A-device and the B-device to transition between states according to a transition condition.

The state transition of the A-device and the B-device is described below.

1.4 State Transition of A-device

Figure 5:
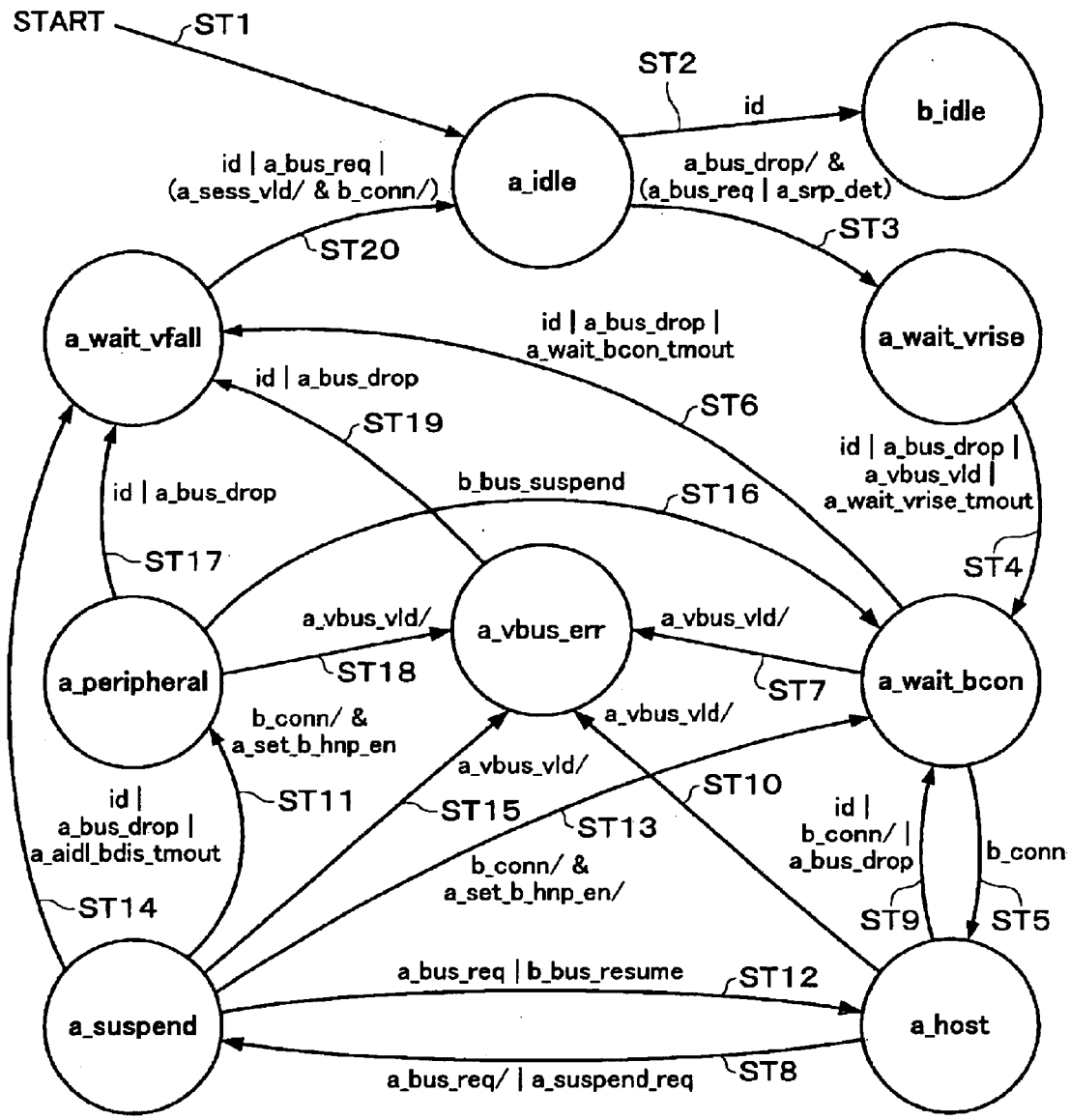
FIG. 5 is a view illustrating state transition of an A-device.

FIG. 5 is a view illustrating state transition of the A-device.

The a_idle state is the start state for the A-device (ST1).

If a Mini-A plug of the USB cable is not inserted into the Mini-AB receptacle of the dual-role device, the pulled-up ID terminal is at the "H" level (id), whereby the dual-role device transitions to the b_idle state (ST2). Specifically, the dual-role device defaults to a B-device. If a Mini-A plug is inserted, the ID terminal is at the "L" level (id/), whereby the dual-role device transitions to the a_idle state (ST1).

Supply of current to VBUS is suspended in the a_idle state. The pull-up of the data signal line D+ is disabled (turned off) (pull-down is enabled; in more detail, switch circuit SW1 is turned off and switch circuit SW2 is turned on). Therefore, the line state is in the "SE0" state. If the host application does not request dropping the voltage of the VBUS line (a_bus_drop/), and if the A-device wants to perform USB transfer (a_bus_req) or detects SRP from the B-device (a_srp_det), the A-device transitions to the a_wait_vrise state (ST3).

In the a_wait_vrise state, current starts to be supplied to the VBUS line and the voltage of the VBUS line rises. If the Mini-A plug is removed (id), if the host application requests dropping the voltage of the VBUS line (a_bus_drop), if the voltage of the VBUS line is larger than a given threshold voltage (a_vbus_vld), or if a predetermined period of time has elapsed in the a_wait_vrise state (a_wait_vrise_tmout), the A-device transitions to the a_wait_bcon state (ST4).

In the a_wait_bcon state, the pull-up of the data signal line D+ in the A-device is in an off state. If the pull-up of the data signal line D+ is enabled (turned on) by the B-device (switch circuit SW3 is turned on and switch circuit SW4 is turned off) to allow the data signal line D+ to be at the "H" level (line state is in the "J" state) (b_conn), the A-device transitions to the a_host state (ST5). If the Mini-A plug is removed (id), if the host application requests dropping the voltage of the VBUS line (a_bus_drop), or if a predetermined period of time has elapsed in the a_wait_bcon state (a_wait_bcon_tmout), the A-device transitions to the a_wait_vfall state (ST6). If the voltage of the VBUS line drops below the given threshold voltage (a_vbus_vld/), the A-device transitions to the a_vbus_err state (ST7).

Specifically, since the dual-role device defaults to a B-device, the data signal line D+ remains pulled down in the A-device until the a_wait_bcon state. When current starts to be supplied to the VBUS line in the a_wait_vrise state, the pull-up of the B-device is turned on. This allows the A-device in which the data signal line D+ is pulled down to operate as the host, and the B-device in which the data signal line D+ is pulled up to operate as the peripheral.

In the a_host state, the A-device operates as the host of the USB standard. In more detail, the A-device drives the data signal lines into the "SE0" state as a bus reset signal in order to enumerate the peripheral as the host. The peripheral is reset by allowing this state to continue for a given period of time. The host transfers configuration information, assigns an address, and the like by using control transfer, and starts USB transfer. In the a_host state, if the A-device as the host finishes using the bus (a_bus_req/), or if transition to the suspend state is requested (a_suspend_req), the A-device transitions to the a_suspend state (ST8). If the Mini-A plug is removed (id), if the line state is changed to the "SE0" state from the "J" state (b_conn/), or if the host application requests dropping the voltage of the VBUS line (a_bus_drop), the A-device transitions to the a_wait_bcon state (ST9). If the voltage of the VBUS line drops below the given threshold voltage (a_vbus_vld/), the A-device transitions to the a_vbus_err state (ST10).

In the a_suspend state, issuance of SOF (Start Of Frame) packets is suspended. The B-device operates as the peripheral and remains in the b_peripheral state. If the A-device enables HNP by the B-device (a_set_b_hnp_en), and the pull-up is turned off in the B-device to put the line state in the "SE0" state (b_conn/), the A-device transitions to the a_peripheral state (STF11). If the A-device wants to use the bus (a_bus_req), or if the B-device puts the line state in the "K" state (b_bus_resume), the A-device transitions to the a_host state (ST12). If the A-device disables HNP by the B-device (a_set_b_hnp_en/), and the pull-up is turned off in the B-device to put the line state in the "SE0" state (b_conn/), the A-device transitions to the a_wait_bcon state (ST13). If the Mini-A plug is removed (id), if the host application requests dropping the voltage of the VBUS line (a_bus_drop), or if a predetermined period of time has elapsed in the a_suspend state (a_aidl_bdis_tmout), the A-device transitions to the a_wait_vfall state (ST14). If the voltage of the VBUS line drops below the given threshold voltage (a_vbus_vld/), the A-device transitions to the a_vbus_err state (ST15).

In the a_peripheral state, since the pull-up is turned on in the A-device and the pull-up is turned off in the B-device by HNP enable from the A-device as described later, the A-device becomes the peripheral and the B-device becomes the host. If the B-device finishes using the bus such as in the case where the B-device as the host finishes data transfer (b_bus_suspend), the A-device transitions to the a_wait_bcon state (ST16). In the a_wait_bcon state, the pull-up of the A-device is turned off as described above. In the a_peripheral state, if the Mini-A plug is removed (id), or if the host application requests dropping the voltage of the VBUS line (a_bus_drop), the A-device transitions to the a_wait_vfall state (ST17). If the voltage of the VBUS line drops below the given threshold voltage (a_vbus_vld/), the A-device transitions to the a_vbus_err state (ST18).

Since an overcurrent condition occurs in the a_bus_err state, firmware requests the A-device to drop the voltage of the VBUS line, for example. In the a_vbus_err state, if the Mini-A plug is removed (id), or if the host application requests dropping the voltage of the VBUS line (a_bus_drop), the A-device transitions to the a_wait_vfall state (ST19).

In the a_wait_vfall state, supply of current to the VBUS line is suspended. If the Mini-A plug is removed (id), if the A-device wants to use the bus (a_bus_req), or if the pull-up in the B-device is turned off in a state in which the voltage of the VBUS line is below the given threshold voltage (a_sess_vld/) to allow the line state to be in the "SE0" state (b_conn/), the A-device transitions to the a_idle state (ST20).

1.5 State Transition of B-device

Figure 6:
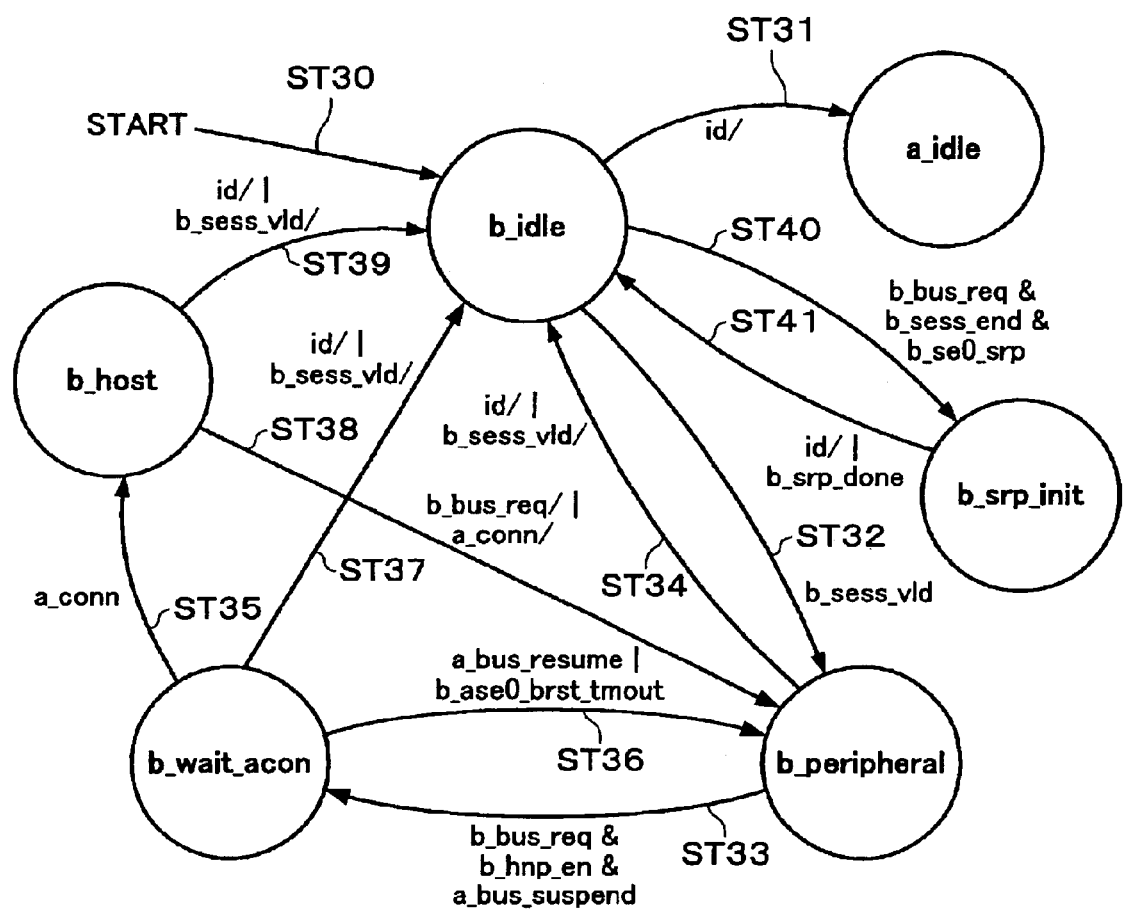
FIG. 6 is a view illustrating state transition of a B-device.

FIG. 6 is a view illustrating state transition of the B-device.

The b_idle state is the start state for the B-device (ST30).

In the b_idle state, supply of current to the VBUS line is suspended. Therefore, the voltage of the VBUS line is below the given threshold voltage. The pull-up of the data signal line D+ is turned off. If a Mini-A plug is inserted, since the ID terminal is at the "L" level (id/), the B-device transitions to the a_idle state (ST31). If the voltage of the VBUS line is larger than the given threshold voltage (b_sess_vld), the B-device transitions to the b_peripheral state (ST32).

In the b_peripheral state, since the pull-up of the data signal line D+ is turned on, b_conn can be detected in the a_wait_bcon state of the A-device. In the b_peripheral state, the B-device operates as the peripheral in response to a request from the A-device. If the B-device detects that the A-device is in the a_suspend state (a_bus_suspend), the host application of the B-device requests the host operation (b_bus_req), and HNP is enabled by the A-device (b_hnp_en), the B-device transitions to the b_wait_acon state (ST33). In the b_peripheral state, if a Mini-A plug is inserted (id/), or if the voltage of the VBUS line drops below the given threshold voltage (b_sess_vld/), the B-device transitions to the b_idle state (ST34). As a result, the pull-up is turned off in the b_idle state, whereby the A-device transitions from the a_wait_vfall state to the a_idle state, for example.

In the b_wait_acon state, the B-device turns off the pull-up of the data signal line D+ and waits for the A-device to pull up the data signal line D+. If the pull-up of the data signal line D+ is turned on in the A-device (a_conn), the B-device transitions to the b_host state (ST35). In the b_wait_acon state, if the B-device detects that the A-device puts the line state in the "K" state (a_bus_resume), or if a predetermined period of time has elapsed in the b_wait_acon state (b_ase0_brst_tmout), the B-device transitions to the b_peripheral state (ST36). If a Mini-A plug is inserted (id/), or if the voltage of the VBUS line is below the given threshold voltage (b_sess_vld/), the B-device transitions to the b_idle state (ST37).

The host processing is performed in the b_host state. Specifically, the B-device resets the bus and starts issuing SOF packets. The A-device responds to a request from the B-device which operates as the host. If the B-device completes data transfer as the host and finishes using the bus (b_bus_req/), or if the B-device detects that the pull-up is turned off in the A-device (a_conn/), the B-device transitions to the b_peripheral state (ST38). The A-device detects the b_peripheral state as the b_bus_suspend of the B-device, whereby the A-device transitions from the a_peripheral state to the a_wait_bcon state. As a result, the pull-up of the A-device is turned off. In the b_peripheral state, the pull-up of the B-device is turned on. In the b_host state, if a Mini-A plug is inserted (id/), or if the voltage of the VBUS line is below the given threshold voltage (b_sess_vld/), the B-device transitions to the b_idle state (ST39).

The B-device requests start of a session by SRP when the A-device is in the suspend state. Specifically, if the host application of the B-device requests use of the bus (b_bus_req), the voltage of the VBUS line is below a session end threshold voltage of the B-device (b_sess_end), and a predetermined period of time has elapsed in a state in which the line state is in the "SE0" state (b_se0_srp), the B-device transitions to the b_srp_init state (ST40).

In the b_srp_init state, the B-device requests the A-device to start a session by SRP. If the B-device completes SRP (b_srp_done), or if a Mini-A plug is inserted (id/), the B-device transitions to the b_idle state (ST41).

2. Data Transfer Control Device

A device conforming to the OTG standard must operate by using a self-power supply in order to initiate SRP. Therefore, in the case where the OTG device is connected with a standard host conforming to USB (USB 1.1 or USB 2.0), the OTG device unnecessarily consumes power provided therein even if the standard host supplies current to the VBUS line.

A data transfer control device in the following embodiment as a device conforming to the OTG standard is capable of reducing unnecessary power consumption by using a power supply switching circuit while realizing the operation as the dual-role device by state transition.

2.1 First Embodiment

A data transfer control device in a first embodiment switches the power supply from a self-power supply to a bus power supply by using a power supply switching circuit.

Figure 7:
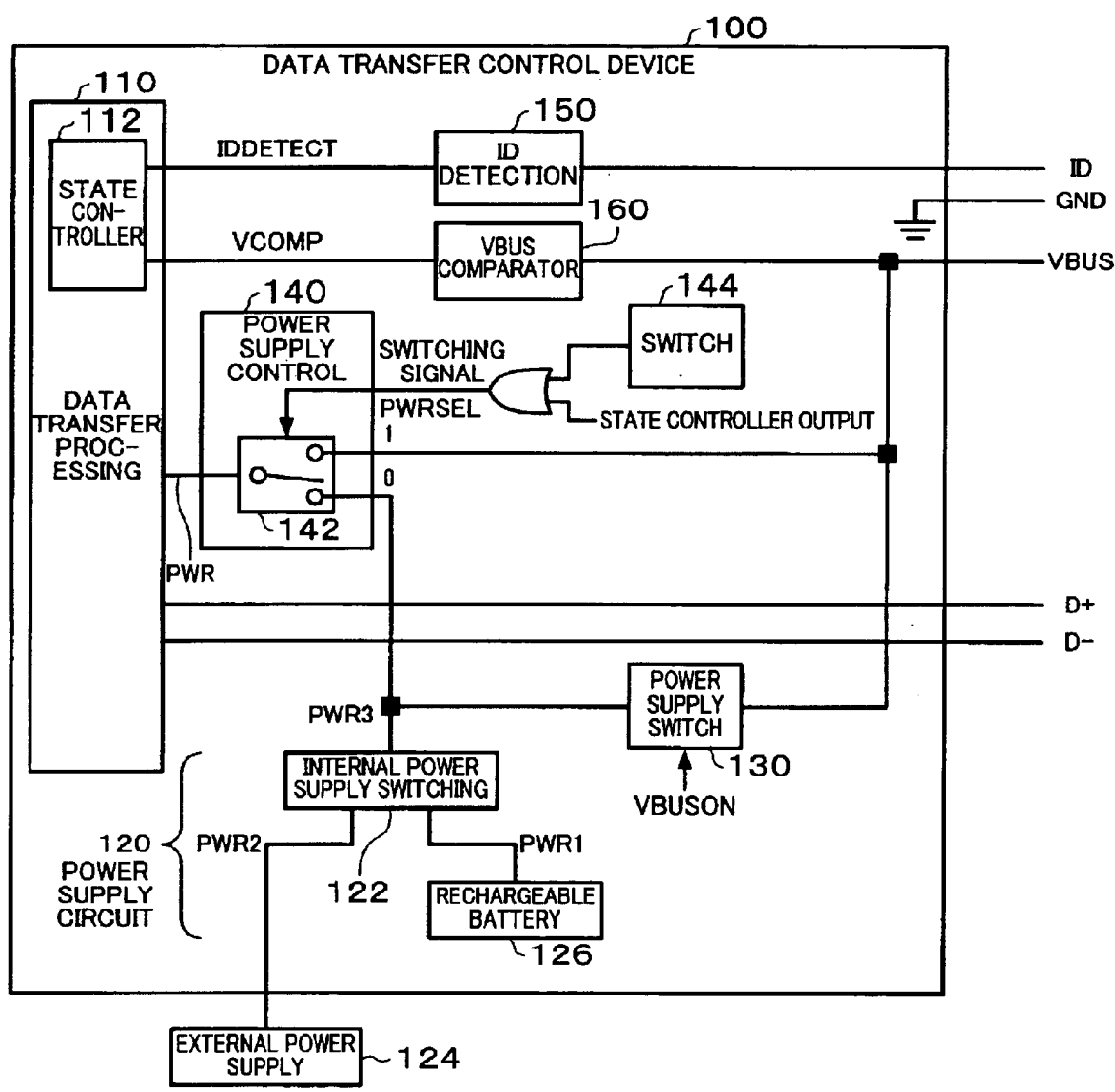
FIG. 7 is a configuration block diagram of a data transfer control device in a first embodiment.

FIG. 7 shows an outline of a configuration of a data transfer control device in the first embodiment.

A data transfer control device 100 controls data transfer according to the OTG standard as an OTG controller.

The data transfer control device 100 includes a data transfer processing circuit 110, a power supply circuit 120, a power supply switch circuit 130, a power supply control circuit 140, an ID detection circuit 150, and a VBUS comparator 160.

The data transfer processing circuit 110 includes a state controller 112. The state controller 112 switches between a host operation and a peripheral operation of an A-device (first device), or between a host operation and a peripheral operation of a B-device (second device) by state transition shown in FIGS. 5 and 6. The data transfer processing circuit 110 processes data transfer according to the OTG standard through data signal lines (data lines D+ and D−) by state transition of the state controller 112.

The power supply circuit 120 includes an internal power supply switching circuit 122. The internal power supply switching circuit 122 provides power to the VBUS line through the power supply switch circuit 130 or the data transfer processing circuit 110 through the power supply control circuit 140 from either an external power supply (AC power supply) 124 connected through a socket or the like or a rechargeable battery 126 provided in the data transfer control device 100, for example.

The power supply switch circuit 130 electrically connects the power supply circuit 120 with the VBUS line based on a control signal VBUSON corresponding to the state transition of the state controller 112. The control signal VBUSON goes active in the a_wait_vrise state, the a_wait_bcon state, the a_host state, the a_suspend state, and the a_peripheral state of the A-device shown in FIG. 5. The control signal VBUSON goes active when performing VBUS pulsing in the b_srp_init state of the B-device shown in FIG. 6. The power supply switch circuit 130 electrically connects the power supply circuit 120 with the VBUS line when the control signal VBUSON is activated.

The power supply control circuit 140 includes a power supply switching circuit 142. The power supply switching circuit 142 electrically connects either the VBUS line or the power supply circuit 120 with the data transfer processing circuit 110 by a switching signal PWRSEL. Specifically, power is provided to the data transfer processing circuit 110 by the switching signal PWRSEL from either the VBUS line or the power supply circuit 120.

The switching signal PWRSEL is generated based on an output signal of a switch circuit 144 or a control signal from the state controller 112. The switch circuit 144 may be a switch circuit which can be mechanically turned on/off, for example, and may be configured to be switched manually by the operator of the data transfer control device 100. The switch circuit 144 may be a switch circuit which can be turned on/off by using software. The switching signal PWRSEL may be generated based on the output signal of the switch circuit 144 and the control signal from the state controller 112.

The ID detection circuit 150 detects the voltage of the signal line connected with the ID terminal in the same manner as the ID detection circuits 12 and 22 shown in FIG. 2, and detects the type of plug of the USB cable.

The VBUS comparator 160 monitors the voltage of the VBUS line. In more detail, the VBUS comparator 160 detects whether or not the voltage of the VBUS line is larger than the session valid threshold (Va_sess_vld) of the A-device or the VBUS Valid threshold (Va_VBUS_vld) when the data transfer control device operates as the A-device. The VBUS comparator 160 detects whether or not the voltage of the VBUS line is larger than the session valid threshold (Vb_sess_vld) of the B-device when the data transfer control device operates as the B-device. An ID detection signal IDDETECT, which is an output of the ID detection circuit 150, is input to the state controller 112. A VBUS detection signal VCOMP, which is an output of the VBUS comparator 160, is input to the state controller 112.

Figure 8:
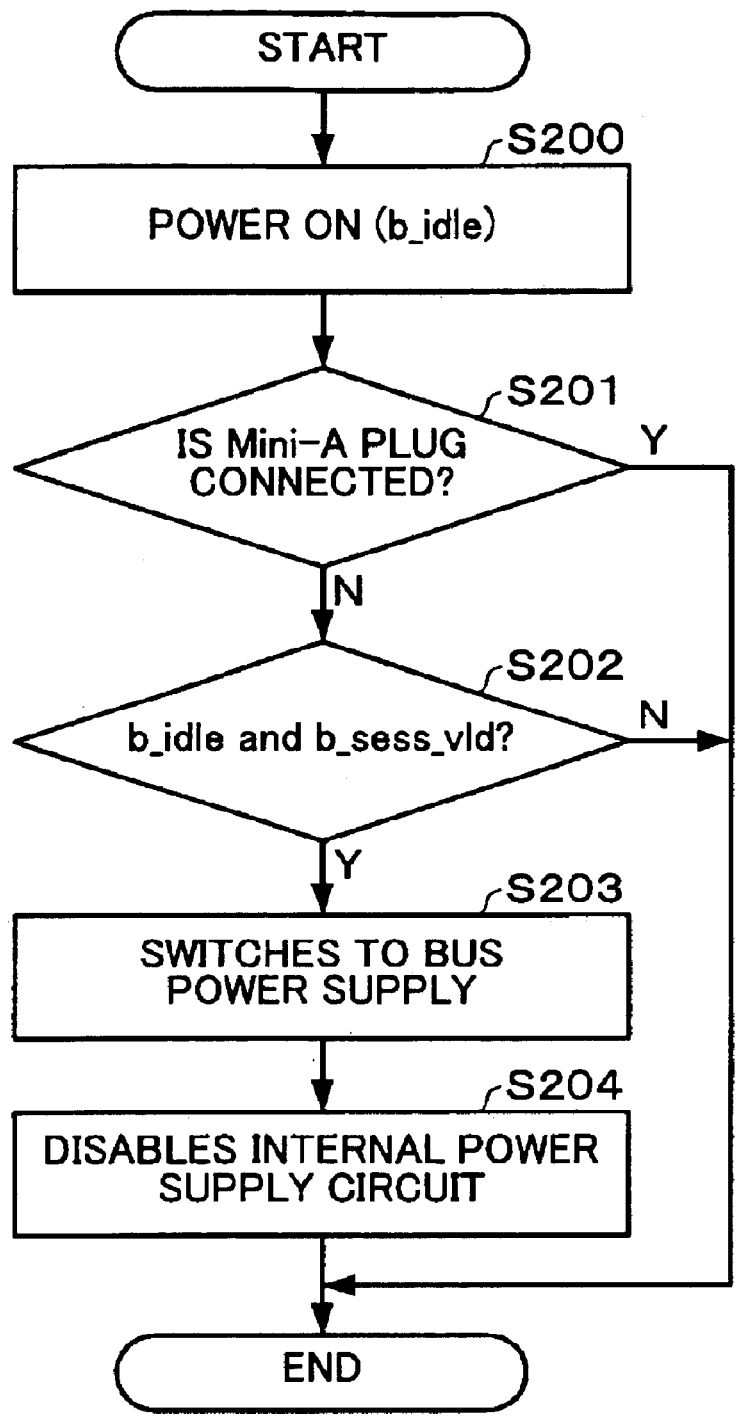
FIG. 8 is a flowchart showing an example of power-supply switching flow of the data transfer control device in the first embodiment.

FIG. 8 is a flowchart showing an example of power supply switching of the data transfer control device in the first embodiment.

In this example, the switching signal is generated based on the output of state controller 112.

The data transfer control device 100 is initialized when the power supply is turned on. The state controller 112 transitions to the b_idle state (step S200), as shown in FIGS. 5 and 6. This allows the data transfer processing circuit and other circuit blocks to be operated by a self-power supply, specifically, by a power supply from the external power supply 124 or the rechargeable battery 126 shown in FIG. 7.

If a USB cable is connected by the user, the ID detection circuit 150 detects the voltage of the signal line connected to the ID terminal (step S201). If the ID detection circuit 150 detects that the plug of the connected USB cable is not a Mini-A plug, specifically, the ID detection signal IDDETECT is "L" (step S201: N), the data transfer control device 100 detects the output of the state controller 112 (step S202).

In more detail, the data transfer control device 100 detects whether or not the state controller 112 is in the b_idle state (idle state of the B-device in a broad sense) and the voltage of the VBUS line is larger than "Vb_sess_vld" (first threshold value) (b_sess_vld is true) from the output of the state controller 112. This step judges whether or not a data transfer partner is a standard USB host or an A-device of the OTG standard which always provides power to the VBUS line.

If the state is the b_idle state and b_sess_vld is true (step S202: Y), the power supply is switched from the self-power supply to the bus power supply (step S203). Specifically, the power supply switching circuit 142 of the power supply control circuit 140 switches the power supply so that power is provided to the data transfer processing circuit 110 from the VBUS line. This allows the data transfer processing circuit 110 to operate by using the bus power supply even when the data transfer control device operates as the B-device.

The power supply circuit 120 is then disabled to reduce unnecessary power consumption (step S204). In more detail, the internal power supply switching circuit 122 electrically disconnects the external power supply 124 or the rechargeable battery 126 from the internal circuits.

If the ID detection circuit 150 detects that the plug of the connected USB cable is a Mini-A plug in the step S201 (step S201: Y), or if the state is not the b_idle state and b_sess_vld is false in the step S202 (step S202: N), at least the data transfer processing circuit 110 continuously operates by using the self-power supply. If "N" in the step S202, the data transfer control device 100 initiates SRP for the connection partner by using the self-power supply.

As described above, when the data transfer control device 100 confirms that power is supplied to the VBUS line from the connection partner in the case where it is necessary for the data transfer control device 100 to operate by using the self-power supply, the power supply can be switched from the self-power supply to the bus power supply (internal supply source can be switched from the power supply circuit 120 to the VBUS line). Therefore, since the internal circuits can be operated by using the power supplied from the connection partner, unnecessary power consumption by the internal power supply circuit can be reduced.

FIG. 8 illustrates the case where the switching signal PWRSEL is generated based on the output of state controller 112. However, the switching signal PWRSEL may be generated by using the switch circuit 144 or software.

2.2 Second Embodiment

The first embodiment provides a data transfer control device capable of switching from the self-power supply to the bus power supply by using the power supply switching circuit 142 of the power supply control circuit 140. However, in the case where the connection partner which provides power to the VBUS line cannot provide power for some reason after switching to the bus power supply, the data transfer control device cannot but stop data transfer control as an abnormal state.

In a second embodiment, the internal circuits can continue operating normally by using a backup power supply even if the connection partner which provides power to the VBUS line stops providing power for some reason after switching to the bus power supply.

Figure 9:
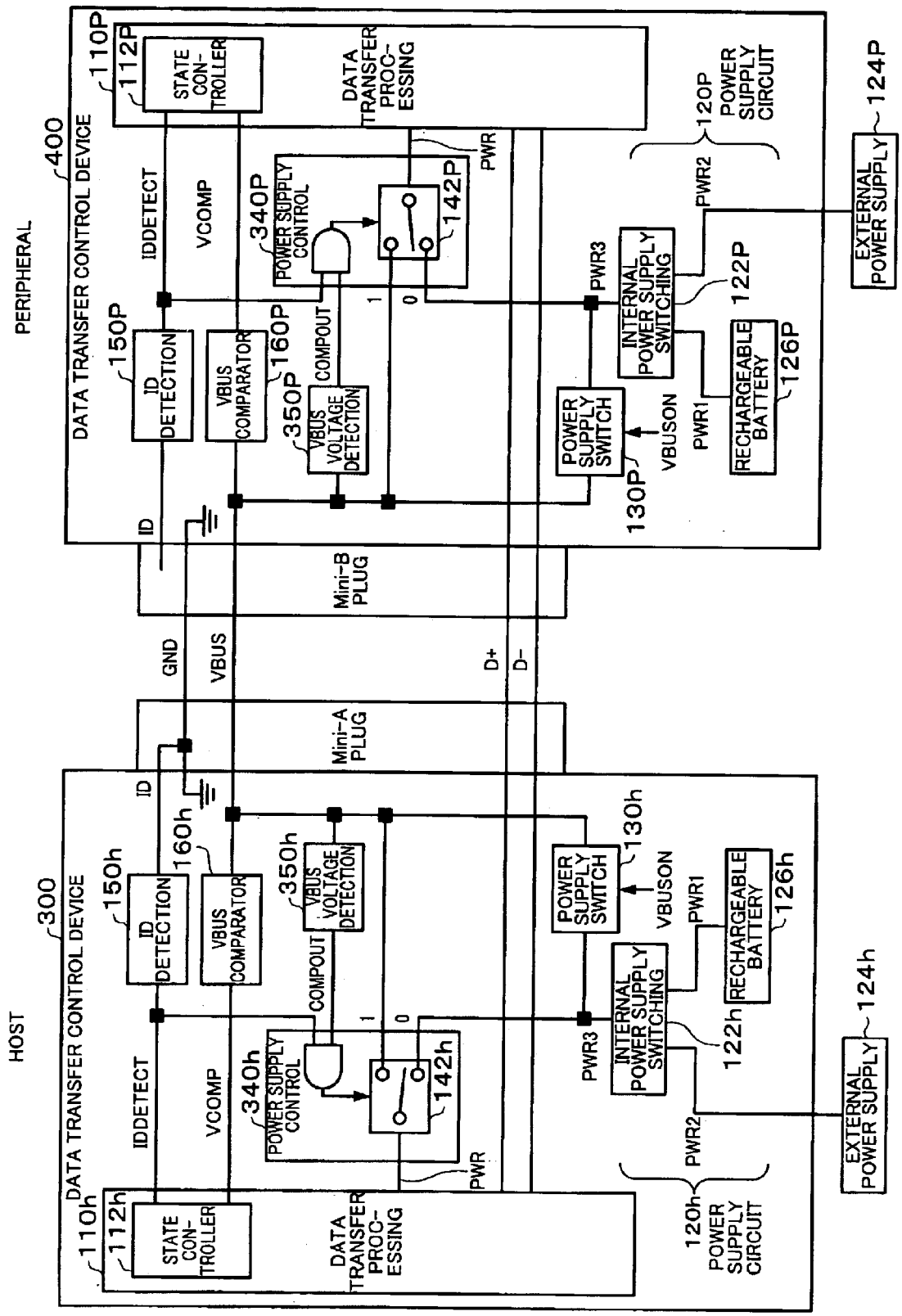
FIG. 9 is a configuration block diagram of a data transfer control device in a second embodiment.

FIG. 9 shows an outline of a configuration of a data transfer control device in the second embodiment.

FIG. 9 shows a state in which data transfer control devices in the second embodiment are connected through a USB cable. Specifically, one of the data transfer control devices is provided to electronic equipment P on the host side as an A-device and the other is provided to electronic equipment Q on the peripheral side as a B-device.

In FIG. 9, sections the same as the sections of the data transfer control device in the first embodiment shown in FIG. 7 are indicated by the same symbols. Description of these sections is appropriately omitted. However, "h" which indicates a block on the host side or "p" which indicates a block on the peripheral side is attached to each of the symbols.

Data transfer control devices 300 and 400 provided to the electronic equipment P and the electronic equipment Q have the same configuration. As shown in FIG. 9, since a Mini-A plug is connected with the data transfer control device 300, the data transfer control device 300 operates as an A-device. Since a Mini-B plug is connected with the data transfer control device 400, the data transfer control device 400 operates as a B-device.

The data transfer control devices 300 and 400 differ from the data transfer control device 100 in the first embodiment in that the configuration of power supply control circuits 340h and 340p and the addition of VBUS voltage detection circuits (power supply line voltage detection circuits) 350h and 350p.

The power supply control circuits 340h and 340p respectively include the power supply switching circuits 142h and 142p. The switching signal PWRSEL input to the power supply switching circuit 142h is AND operation results for the ID detection circuit 150h and an output signal COMPOUT of the VBUS voltage detection circuit 350h. The switching signal PWRSEL input to the power supply switching circuit 142p is AND operation results for the ID detection circuit 150p and the output signal COMPOUT of the VBUS voltage detection circuit 350p.

The VBUS voltage detection circuits 350h and 350p detect whether or not the voltage of the VBUS line is larger than a given threshold value (second threshold value), and output the detection results as the output signal COMPOUT. A threshold value (second threshold value) of the VBUS voltage detection circuit. 350h is higher than a threshold value (first threshold value) of the VBUS comparator 160h. A threshold value (second threshold value) of the VBUS voltage detection circuit 350p is higher than a threshold value (first threshold value) of the VBUS comparator 160p.

Figure 10:
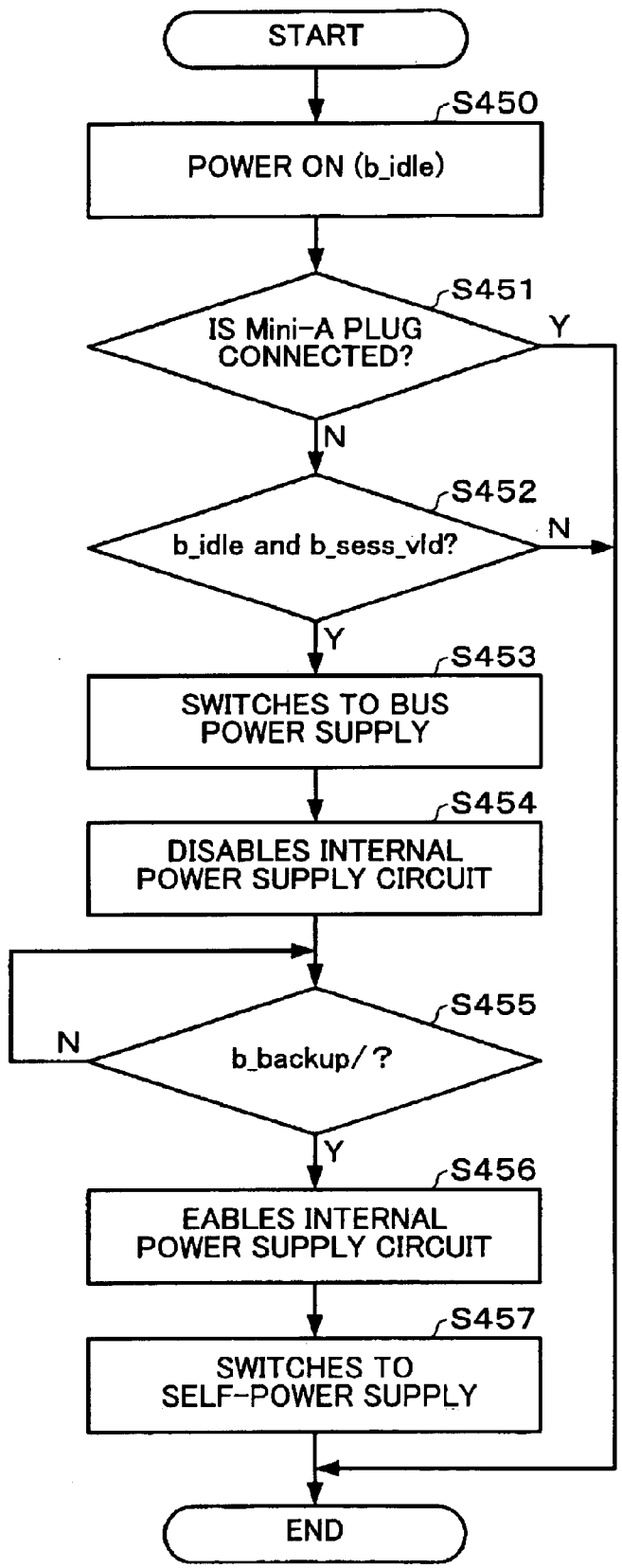
FIG. 10 is a flowchart showing an example of power-supply switching flow of the data transfer control device in the second embodiment.

FIG. 10 is a flowchart showing an example of power supply switching of the data transfer control device in the second embodiment.

The data transfer control device is initialized when the power supply is turned on. The state controller transitions to the b_idle state (step S450), as shown in FIGS. 5 and 6. This allows the data transfer processing circuit and other circuit blocks to be operated by the self-power supply, specifically, by a power supply from the external power supply 124h (124p) or the rechargeable battery 126h (126p) shown in FIG. 10.

When a USB cable is connected by the user, the ID detection circuit 150h (150p) detects the voltage of the signal line connected with the ID terminal (step S451). If the ID detection circuit 150h (150p) detects that the plug of the connected USB cable is not a Mini-A plug, specifically, the ID detection signal IDDETECT is "L" (step S451: N), the data transfer control device judges the output of the state controller 112h (112p) (step S452).

In more detail, the data transfer control device detects whether or not the state controller 112h (112p) is in the b_idle state (idle state of the B-device in a broad sense) and the voltage of the VBUS line is larger than "Vb_sess_vld" (first threshold value) (b_sess_vld is true) from the output of the state controller 112h (112p). If the state is the b_idle state and b_sess_vld is true (step S452: Y), the power supply is switched from the self-power supply to the bus power supply (step S453). Specifically, the power supply switching circuit 142h (142p) of the power supply control circuit 340h (340p) switches the power supply so that power is supplied to the data transfer processing circuit 110h (110p) from the VBUS line.

The power supply circuit 120h (120p) is then disabled to reduce unnecessary power consumption (step S454). In more detail, the internal power supply switching circuit 122h (122p) electrically disconnects the external power supply 124h (124p) or the rechargeable battery 126h (126p) from other internal circuits.

The data transfer control device detects whether or not a state variable b_backup is false (step S455). The state variable b_backup becomes true when the voltage of the VBUS line is larger than a backup threshold value $V_{B\_BACKUP}$ (second threshold value). The backup threshold value $V_{B\_BACKUP}$ is a threshold value which can be arbitrarily set, and is higher than the session valid voltage "Vb_sess_vld" (first threshold value) of the B-device and lower than the VBUS valid voltage "Va_VBUS_vld" of the A-device. The state variable b_backup is the output signal COMPOUT of the VBUS voltage detection circuit 350h (350p).

When the state variable b_backup becomes false (step S455: N), specifically, when the voltage of the VBUS line drops below the backup threshold value $V_{B\_BACKUP}$ (second threshold value), the power supply circuit 120 is enabled (step S456), whereby the power supply is switched to the self-power supply (step S457).

If the ID detection circuit 150h (150p) detects that the plug of the connected USB cable is a Mini-A plug in the step S451 (step S451: Y), or if the state is not in the b_idle state and b_sess_vld is false in the step S452 (step S452: N), at least the data transfer processing circuit 110 continues operating by using the self-power supply. If "N" in the step S452, the data transfer control device can initiate SRP for the connection partner by using the self-power supply.

As described above, even if power is not provided to the VBUS line for some reason in the data transfer control device conforming to the OTG standard after the power supply is switched from the self-power supply to the bus power supply, the power supply is switched to the self-power supply by detecting the voltage drop of the VBUS line. This enables the power supply to be switched to the self-power supply even if the power supply to the VBUS line stops for some reason after the power supply is switched to the bus power supply in the B-device, whereby power can be continuously provided to the internal circuits from the backup power supply such as the rechargeable battery.

A specific operation of the data transfer control device in the second embodiment is described below.

Figure 11:
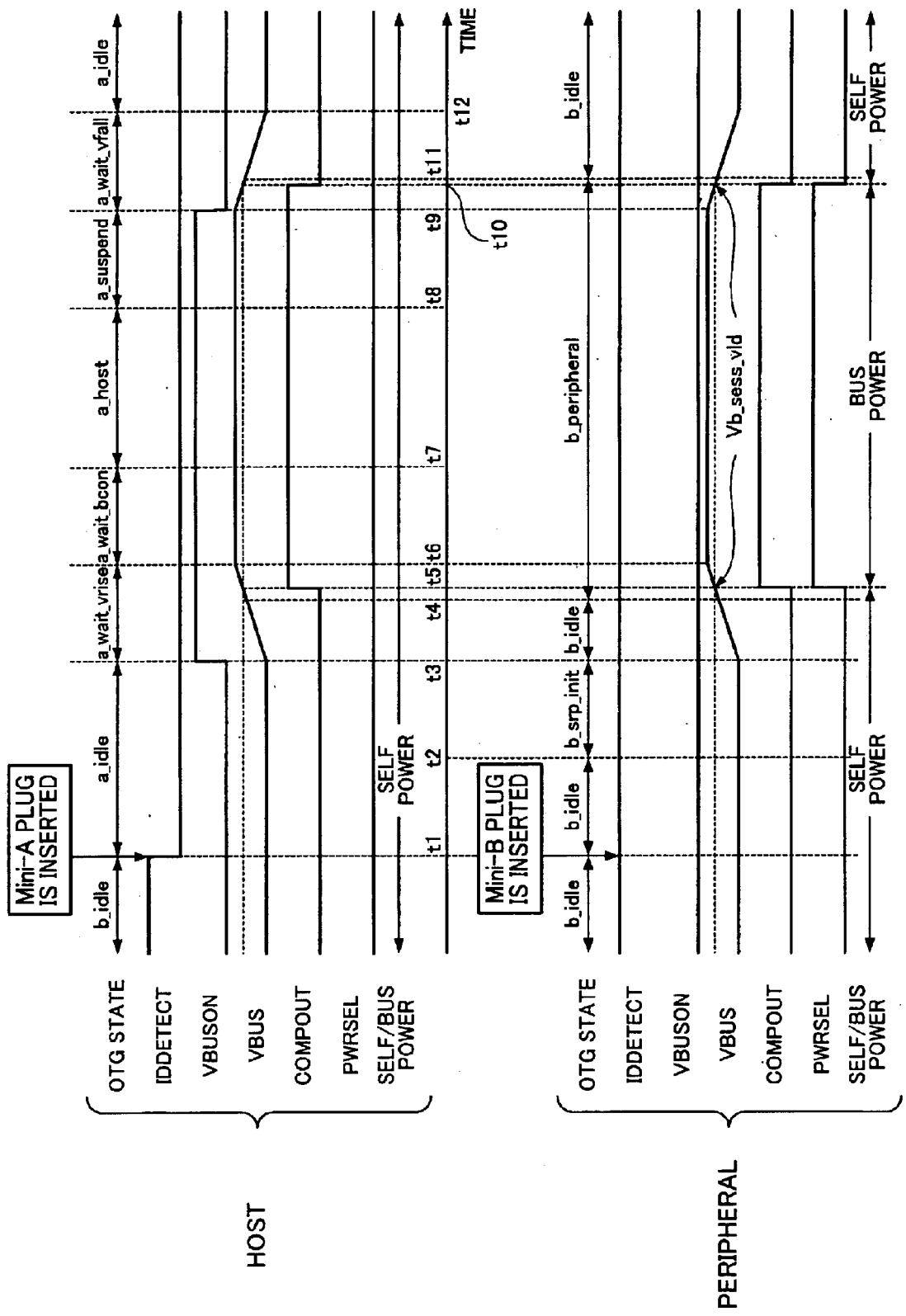
FIG. 11 is a timing chart showing an example of power supply switching in the case where the data transfer control devices in the second embodiment shown in FIG. 9 are connected.

FIG. 11 shows an example of a timing chart of power supply switching in the case where the data transfer control devices in the second embodiment shown in FIG. 9 are connected.

The data transfer control devices 300 and 400 are initialized when the power supply is turned on, and transition to the idle state of the B-device (b_idle state). Since both the data transfer control devices 300 and 400 control data transfer according to the OTG standard, the data transfer control devices 300 and 400 operate by using a self-power supply in the default state.

A USB cable is connected at a time t1. In this example, a Mini-A plug is connected with the data transfer control device 300 and a Mini-B plug is connected with the data transfer control device 400.

The ID detection signal IDDETECT is "L" in the ID detection circuit 150h of the data transfer control device 300, since the signal line connected with the ID terminal is grounded. Therefore, since the data transfer control device 300 operates as an A-device after the time t1 unless the connection of the USB cable is changed, the data transfer control device 300 transitions to the a_idle state. Specifically, at least data transfer is controlled by using the self-power supply in the default state. The ID detection signal IDDETECT is "H" in the ID detection circuit 150p of the data transfer control device 400, since the ID terminal remains pulled up. Therefore, since the data transfer control device 400 operates as a B-device after the time t1 unless the connection of the USB cable is changed, the data transfer control device 400 remains in the b_idle state. Specifically, at least data transfer is controlled by using the bus power supply in the default state.

The data transfer control device 400 transitions to the b_srp_init state at a time t2 in order to initiate SRP in response to a request using the bus from the host application or the like. In the b_srp_init state, the data transfer control device 400 initiates SRP for the data transfer control device 300. The data transfer control device 300 detects the SRP from the data transfer control device 400, and transitions to the a_wait_vrise state at a time t3. The data transfer control device 400 returns to the b_idle state by b_srp_done (completion of SRP).

In the data transfer control device 300, the control signal VBUSON goes active in the a_wait_vrise state, whereby the power supply circuit 120h is electrically connected with the VBUS line through the power supply switch circuit 130h. This allows current (power supply) to start supplying the VBUS line, whereby the voltage of the VBUS line rises.

In the data transfer control device 400, the voltage of the VBUS line is monitored by the VBUS comparator 160p. The state controller 112p transitions to the b_peripheral state at a time t4 at which the VBUS comparator 160p judges that the voltage of the VBUS line is larger than the session valid threshold value of the B-device (Vb_sess_vld) (first threshold value). The data transfer control device 400 operates as the peripheral in the b_peripheral state in response to the request from the data transfer control device 300 as the A-device.

At a time t5, the VBUS voltage detection circuits 350h and 350p of the data transfer control devices 300 and 400 detect that the voltage of the VBUS line is larger than the backup threshold value $V_{B\_BACKUP}$ (second threshold value) which is set higher than the session valid threshold value of the B-device. The output signals COMPOUT of the VBUS voltage detection circuits 350h and 350p become "H". Therefore, since the switching signal PWRSEL remains "L" in the power supply switching circuit 142h of the data transfer control device 300, the data transfer control device 300 continuously operates by using the self-power supply in a state in which the power supply circuit 120h is connected with the data transfer processing circuit 10h. Since the switching signal PWRSEL is changed to "H" in the power supply switching circuit 142p of the data transfer control device 400, the power supply is switched so that power is supplied to the data transfer processing circuit 110p from the VBUS line, whereby the data transfer control device 400 operates by using the bus power supply.

At a time t6, the data transfer control device 300 which operates as the A-device transitions to the a_wait_bcon state when the VBUS comparator 160h detects that the voltage of the VBUS line is larger than the VBUS valid threshold value of the A-device.

When the data transfer control device 300 confirms that the data line D+ is pulled up in the data transfer control device 400 in the a_wait_bcon state at a time t7, the data transfer control device 300 transitions to the a_host state. In the a_host state, the data transfer control device 300 operates as the host of the USB standard.

If the data transfer control device 300 finishes using the bus or if transition to the suspend state is requested from the host application in the a_host state, the data transfer control device 300 transitions to the a_suspend state at a time t8.

If the host application requests dropping the voltage of the VBUS line, the data transfer control device 300 transitions to the a_wait_vfall state at a time t9. In the a_wait_vfall state, supply of current to the VBUS line is suspended, whereby the voltage of the VBUS line drops.

At a time t10, the VBUS voltage detection circuits 350h and 350p of the data transfer control devices 300 and 400 detect that the voltage of the VBUS line drops below the backup threshold value $V_{B\_BACKUP}$ (second threshold value). At this time, the output signals COMPOUT of the VBUS voltage detection circuits 350h and 350p become "L". Therefore, since the switching signal PWRSEL remains "L" in the power supply switching circuit 142h of the data transfer control device 300, the data transfer control device 300 operates by using the self-power supply in a state in which the power supply circuit 120h is connected with the data transfer processing circuit 110h. Since the switching signal PWRSEL is changed to "L" in the power supply switching circuit 142p of the data transfer control device 400, the power supply is switched so that power is supplied to the data transfer processing circuit 110p from the power supply circuit 120p, whereby the data transfer control device 400 operates by using the self-power supply.

In the data transfer control device 400, when the VBUS comparator 160p judges that the voltage of the VBUS line drops below the session valid threshold value of the B-device (Vb_sess_vld) (first threshold value) at a time t11, the state controller 112p transitions to the b_idle state.

Since the voltage of the VBUS line is below the session valid threshold value (Vb_sess_vld) of the B-device (first threshold value) at a time t12, the pull-up in the data transfer control device 400 is turned off to allow the line state to be in the "SE0" state, whereby the data transfer control device 300 transitions to the a_idle state.

The data transfer control device 300 which operates as the A-device continuously operates by using the self-power supply. The data transfer control device 400 which operates as the B-device controls at least data transfer by using the self-power supply in the default state, and can operate by using the bus power supply when operating as the peripheral in a state in which power is provided through the VBUS line. When the data transfer control device 400 detects that power is not provided through the VBUS line, the data transfer control device 400 switches the power supply to the self-power supply and provides for next data transfer processing.

It is preferable that the data transfer control device set to the B-device detect the voltage of the VBUS line in the b_idle state. Therefore, when switching from the self-power supply to the bus power supply, it is preferable to perform the switching operation after transitioning from the b_idle state to the b_peripheral state. When switching from the bus power supply to the self-power supply, it is preferable to perform the switching operation before transitioning to the b_idle state.

Figure 12:
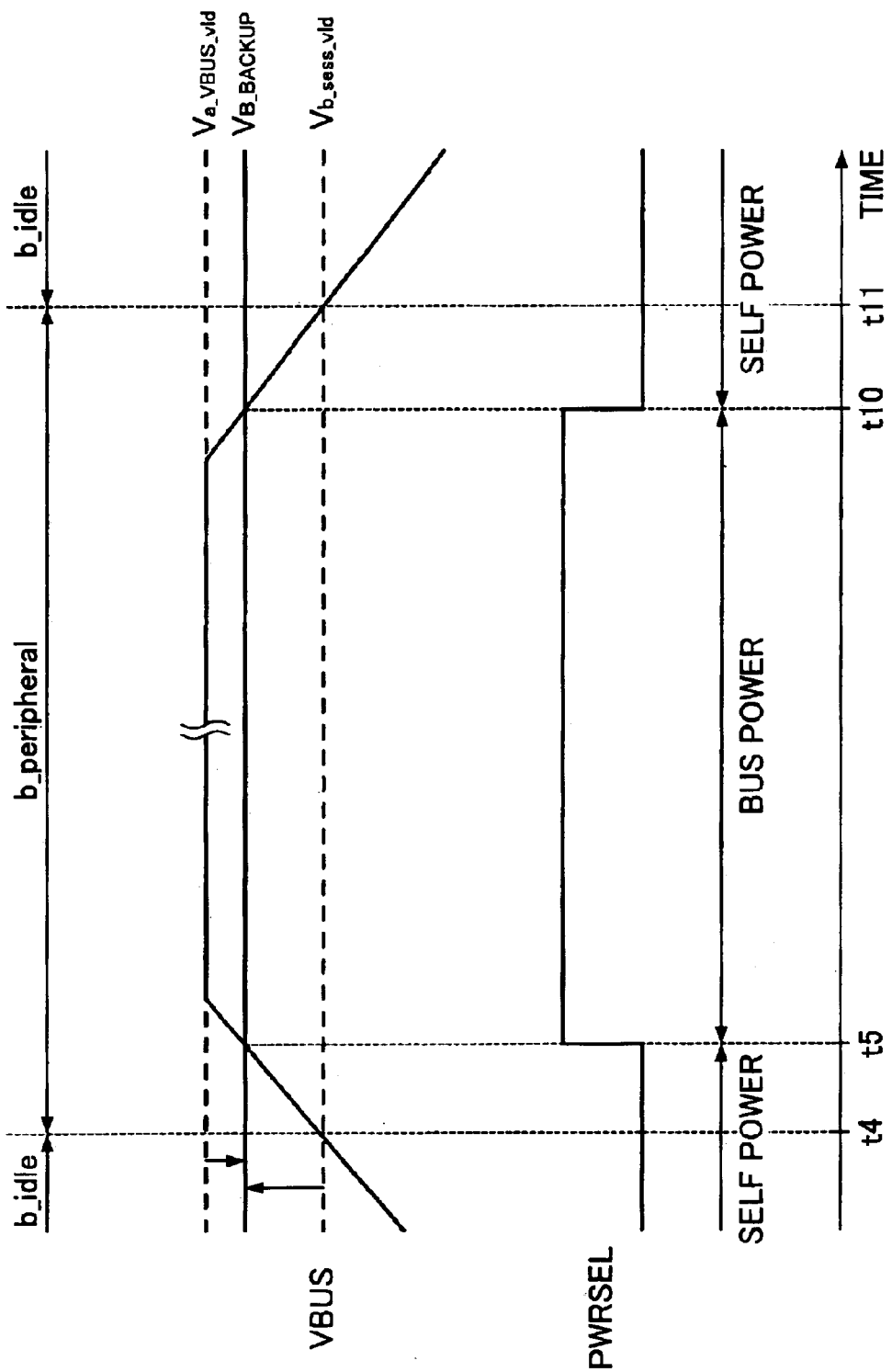
FIG. 12 is a timing chart at the time of switching between a self-power supply and a bus power supply.

FIG. 12 shows a timing chart at the time of switching between the self-power supply and the bus power supply.

FIG. 12 is an enlarged view of the timing chart shown in FIG. 11. In the second embodiment, the backup threshold value $V_{B\_BACKUP}$ (second threshold value) is set to a voltage (4.2 V, for example) which is higher than the session valid threshold value (Vb_sess_vld; 4.0 V, for example) (first threshold value) of the B-device and is lower than the VBUS valid threshold value (Va_VBUS_vld; 4.4 V, for example) of the A-device.

Since the B-device transitions from the b_idle state to the b_periheral state on condition that the voltage of the VBUS line is larger than the session valid threshold value of the B-device (first threshold value), switching from the self-power supply to the bus power supply can be performed in the b_peripheral state.

Since the B-device transitions from the b_periheral state to the b_idle state on condition that the voltage of the VBUS line drops below the session valid threshold value of the B-device (first threshold value), switching from the bus power supply to the self-power supply can be performed in the b_peripheral state.

Since the A-device must allow the voltage of the VBUS line to rise to at least the VBUS valid threshold value Va_VBUS_vld of the A-device, the backup threshold value $V_{B\_BACKUP}$ must be set to be lower than the VBUS valid threshold value Va_VBUS_vld of the A-device.

3. Electronic Equipment

Figure 13A:
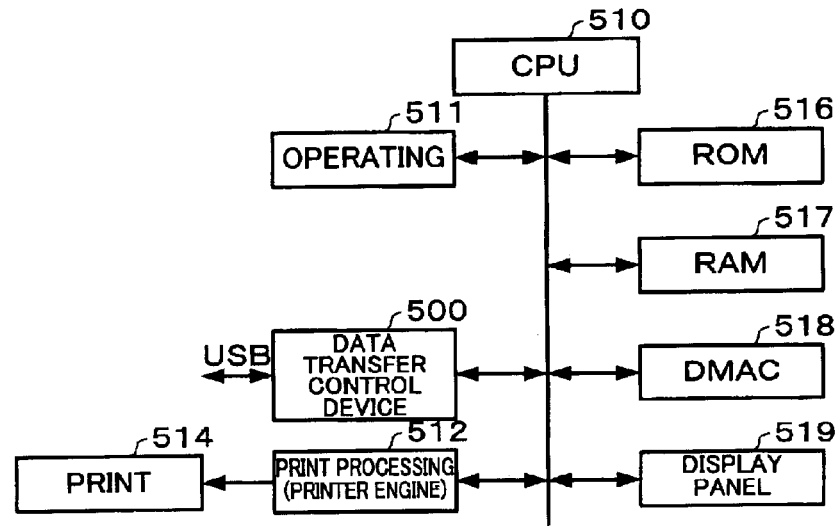
FIGS. 13A, 13B, and 13C are internal block diagrams of electronic equipment.
Figure 14A:
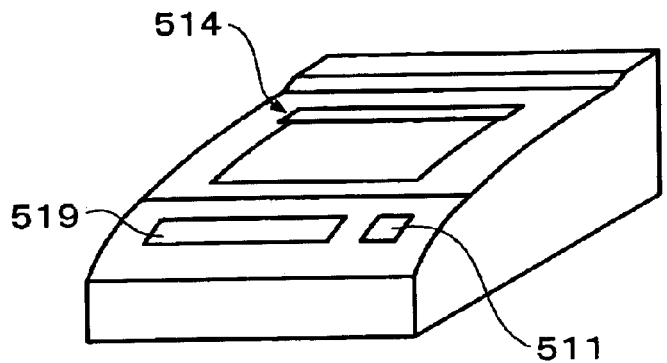
FIGS. 14A, 14B, and 14C are external views of electronic equipment.

Examples of electronic equipment including the data transfer control device in the first or second embodiment are described below. FIG. 13A is an internal block diagram of a printer which is an example of the electronic equipment. FIG. 14A is an external view of the printer. A CPU (microcomputer) 510 controls the entire system and the like. An operating section 511 allows the user to operate the printer. A control program, fonts, and the like are stored in a ROM 516. A RAM 517 functions as a work area for the CPU 510. A DMAC 518 is a DMA controller for transferring data without the CPU 510. A display panel 519 notifies the user of the operation state of the printer.

Serial print data sent from another device such as a personal computer through the USB is converted into parallel print data by a data transfer control device 500. The converted parallel print data is sent to a print processing unit (printer engine) 512 by the CPU 510 or the DMAC 518. The parallel print data is subjected to given processing in the print processing unit 512 and output and printed on paper by a print section (device which performs output processing of data) 514 consisting of a print head and the like.

Figure 13B:
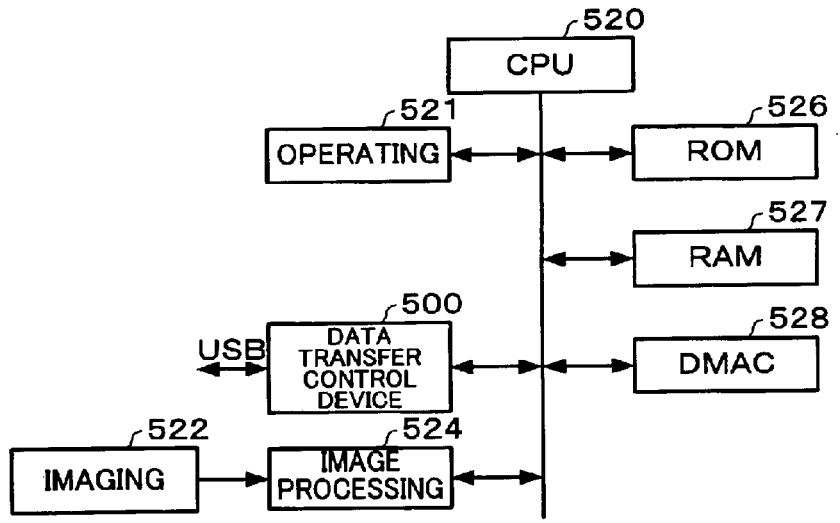
Figure 14B:
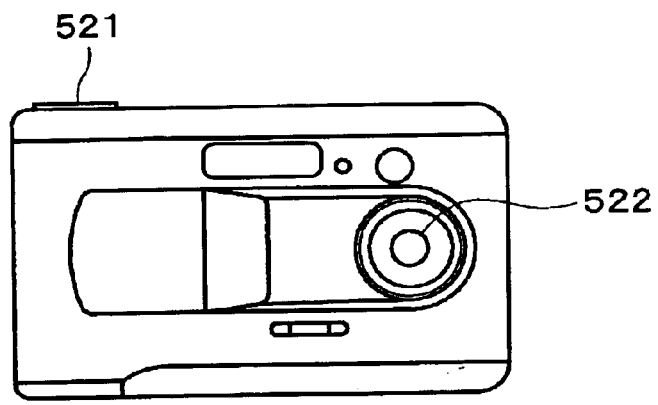

FIG. 13B is an internal block diagram of a digital camera which is another example of electronic equipment. FIG. 14B is an external view of the digital camera. A CPU 520 controls the entire system and the like. An operating section 521 allows the user to operate the digital camera. A control program and the like are stored in a ROM 526. A RAM 527 functions as a work area for the CPU 520. A DMAC 528 is a DMA controller.

An image of an object is taken by an imaging section 522 consisting of a CCD and the like. The image data is processed by an image processing unit 524. The processed image data is sent to the data transfer control device 500 by the CPU 520 or the DMAC 528. The data transfer control device 500 converts the parallel image data into serial data and sends the serial data to another device such as a personal computer through the USB.

Figure 13C:
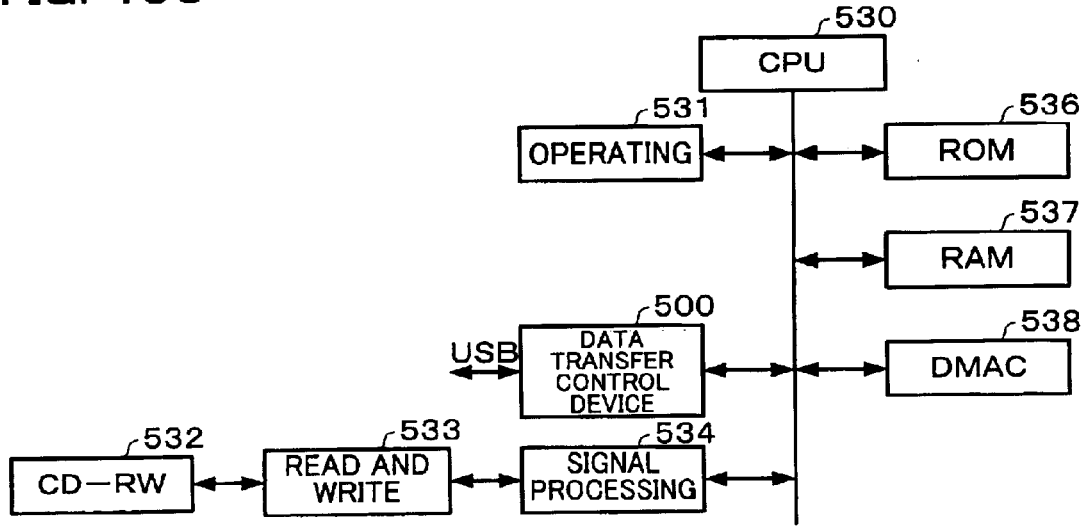
Figure 14C:
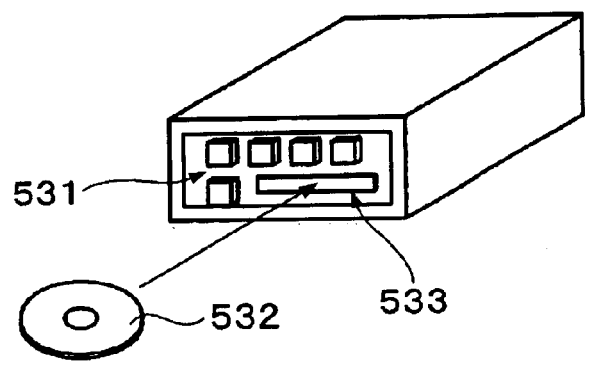

FIG. 13C is an internal block diagram of a CD-RW drive which is still another example of electronic equipment. FIG. 14C is an external view of the CD-RW drive. A CPU 530 controls the entire system and the like. An operating section 531 allows the user to operate the CD-RW drive. A control program and the like are stored in a ROM 536. A RAM 537 functions as a work area for the CPU 530. A DMAC 538 is a DMA controller.

Data read from a CD-RW 532 by a read/write section (device which performs fetch processing or storage processing of data) 533 consisting of a laser, motor, optical system, and the like is input to a signal processing unit 534 and subjected to given signal processing such as error correction processing. The data subjected to the signal processing is sent to the data transfer control device 500 by the CPU 530 or the DMAC 538. The data transfer control device 500 converts the parallel data into serial data and sends the serial data to another device such as a personal computer through the USB.

Serial data sent from another device through the USB is converted into parallel data by the data transfer control device 500. The parallel data is sent to the signal processing unit 534 by the CPU 530 or the DMAC 538. The parallel data is subjected to given signal processing in the signal processing unit 534 and stored on the CD-RW 532 by the read/write section 533.

In FIGS. 13A, 13B, and 13C, another CPU for controlling data transfer by the data transfer control device 500 may be provided in addition to the CPU 510, 520 or 530.

USB transfer can be performed without connecting the electronic equipment with a personal computer which performs the host operation by providing the data transfer control device in the above embodiment in electronic equipment. In particular, it is made unnecessary for the user to carry a personal computer by providing the data transfer control device in portable electronic equipment, whereby USB transfer can be readily performed. For example, USB transfer can be performed between a printer or a CD-RW drive without using a personal computer.

A processing load of firmware which operates on the CPU is reduced by providing the data transfer control device in the above embodiment in electronic equipment, whereby an inexpensive CPU can be used. Moreover, since cost and scale of the data transfer control device can be reduced, cost and scale of the electronic equipment can also be reduced.

As other examples of electronic equipment to which the data transfer control device in the above embodiment can be applied, various types of optical disk (CD-ROM and DVD) drives, magneto-optical disk (MO) drives, hard disk drives, TVs, VTRs, video cameras, audio equipment, telephones, projectors, personal computers, electronic notebooks, word processors, and the like can be given.

The present invention is not limited to the first and second embodiments. Various modifications and variations are possible within the spirit and scope of the present invention.

The present invention is particularly preferably applied to data transfer according to the OTG standard. However, the application of the present invention is not limited thereto. For example, the present invention may be applied to data transfer in a standard based on the same idea as the OTG standard and a standard developed from the OTG standard.

The above embodiment illustrates a case where a device into which a Mini-A plug is inserted before transfer is an A-device and a device into which a Mini-B plug is inserted is a B-device. However, the present invention may also be applied to a case where the supply source of VBUS is changed by exchanging the A-device and the B-device during transfer control.

What is claimed is:

1. A data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the data transfer control device comprising:
   a power supply circuit;
   a power supply switch circuit which connects the power supply line with the power supply circuit when the data transfer control device operates as the first device;
   a data transfer processing circuit which transfers data through the data lines; and
   a power supply switching circuit which provides power to the data transfer processing circuit from one of the power supply line and the power supply circuit based on a given switching signal.

2. The data transfer control device as defined in claim 1, further comprising:
   a switch circuit which turns on or off the given switching signal,
   wherein the given switching signal is generated based on output of the switch circuit.

3. A data transfer control device which controls data transfer according to the Universal Serial Bus (USB) On-The-Go (OTG) standard, the data transfer control device comprising:
   a power supply circuit;
   a power supply switch circuit which connects a VBUS line with the power supply circuit when the data transfer control device operates as an A-device;
   a data transfer processing circuit which transfers data through data lines; and
   a power supply switching circuit which provides power to the data transfer processing circuit from one of the VBUS line and the power supply circuit based on a given switching signal,
   wherein the power supply switching circuit provides power to the data transfer processing circuit from the VBUS line when the data transfer control device operates as a B-device and voltage of the VBUS line is detected to be larger than a first threshold value in an idle state.

4. A data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the data transfer control device comprising:
   a power supply circuit;
   a power supply switch circuit which connects the power supply line with the power supply circuit when the data transfer control device operates as the first device;
   a data transfer processing circuit which transfers data through the data lines;
   a power supply line voltage detection circuit which detects whether or not voltage of the power supply line is larger than a second threshold value; and
   a power supply switching circuit which provides power to the data transfer processing circuit from one of the power supply line and the power supply circuit based on a given switching signal,
   wherein the power supply switching circuit provides power to the data transfer processing circuit from the power supply line when the data transfer control device operates as the second device and the voltage of the power supply line is detected to be larger than a first threshold value which is lower than the second threshold value, and provides power to the data transfer processing circuit from the power supply circuit when the voltage of the power supply line that has been larger than the second threshold value drops and then is detected to be equal to or smaller than the second threshold value.

5. A data transfer control device which controls data transfer according to the Universal Serial Bus (USB) On-The-Go (OTG) standard, the data transfer control device comprising:
   a power supply circuit;
   a power supply switch circuit which connects a VBUS line with the power supply circuit when the data transfer control device operates as an A-device;
   a data transfer processing circuit which transfers data through data lines;
   a power supply line voltage detection circuit which detects whether or not voltage of the VBUS line is larger than a second threshold value; and
   a power supply switching circuit which provides power to the data transfer processing circuit from one of the VBUS line and the power supply circuit based on a given switching signal,
   wherein the power supply switching circuit provides power to the data transfer processing circuit from the VBUS line when the data transfer control device operates as a B-device and the voltage of the VBUS line is detected to be larger than a first threshold value which is lower than the second threshold value, and
   provides power to the data transfer processing circuit from the power supply circuit when the voltage of the VBUS line that has been larger than the second threshold voltage drops and then is detected to be equal to or smaller than the second threshold value.

6. The data transfer control device as defined in claim 5, wherein switching of a power source provided to the data transfer processing circuit from the power supply circuit to the VBUS line is performed after a state transition of the B-device from an idle state to a peripheral state, and
   wherein switching of a power source provided to the data transfer processing circuit from the VBUS line to the power supply circuit is performed before a state transition of the B-device from the peripheral state to the idle state.

7. The data transfer control device as defined in claim 5, wherein the second threshold value is higher than a session valid threshold value of the B-device and lower than a VBUS valid threshold value of the A-device.

8. Electronic equipment comprising:
   the data transfer control device as defined in claim 5; and
   a device which performs output processing, fetch processing, or storage processing of data transferred through the data transfer processing circuit and a bus.

9. Electronic equipment comprising:

the data transfer control device as defined in claim 1; and a device which performs output processing, fetch processing, or storage processing of data transferred through the data transfer processing circuit and a bus.

10. Electronic equipment comprising:

the data transfer control device as defined in claim 3; and a device which performs output processing, fetch processing, or storage processing of data transferred through the data transfer processing circuit and a bus.

11. Electronic equipment comprising:

the data transfer control device as defined in claim 4; and a device which performs output processing, fetch processing, or storage processing of data transferred through the data transfer processing circuit and a bus.

12. A power supply switching method for a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the power supply switching method comprising:

detecting whether or not voltage of the power supply line is larger than a first threshold value in an idle state when the data transfer control device operates as the second device in a state in which power is provided to a data transfer processing circuit from a power supply circuit, the data transfer processing circuit transferring data through the data lines, and the power supply circuit being connected with the power supply line when the data transfer control device operates as the first device; and providing power to the data transfer processing circuit from the power supply line when the data transfer control device operates as the second device and the voltage of the power supply line is detected to be larger than the first threshold value in the idle state.

13. A power supply switching method for a data transfer control device which controls data transfer according to the Universal Serial Bus (USB) On-The-Go (QTG) standard, the power supply switching method comprising:

detecting whether or not voltage of a VBUS line is larger than a first threshold value in an idle state when the data transfer control device operates as a B-device in a state in which power is provided to a data transfer processing circuit from a power supply circuit, the data transfer processing circuit transferring data through data lines, and the power supply circuit being connected with the VBUS line when the data transfer control device operates as an A-device; and providing power to the data transfer processing circuit from the VBUS line when the data transfer control device operates as a B-device and voltage of the VBUS line is detected to be larger than the first threshold value in an idle state.

14. A power supply switching method for a data transfer control device which controls data transfer through data lines and a power supply line by controlling switching between a host state and a peripheral state by state transition of a first device which controls data transfer by using a self-power supply in a default state, or by state transition of a second device which controls data transfer by using a bus power supply in a default state, the power supply switching method comprising:

providing power to a data transfer processing circuit from the power supply line when the data transfer control device operates as the second device and the voltage of the power supply line is detected to be larger than a first threshold value in the idle state, in a state in which power is provided to the data transfer processing circuit from a power supply circuit, the data transfer processing circuit transferring data through the data lines, and the power supply circuit being connected with the power supply line when the data transfer control device operates as the first device; and providing power to the data transfer processing circuit from the power supply circuit when the voltage of the power supply line is detected to be equal to or smaller than a second threshold value, in a state in which power is provided to the data transfer processing circuit from the power supply line.

15. The power supply switching method as defined in claim 14, further comprising:

setting the first threshold value lower than the second threshold value.

16. A power supply switching method for a data transfer control device which controls data transfer according to the Universal Serial Bus (USB) On-The-Go (OTG) standard, the power supply switching method comprising:

providing power to a data transfer processing circuit from the VBUS line when voltage of a VBUS line is detected to be larger than a first threshold value in an idle state when the data transfer control device operates as a B-device in a state in which power is provided to the data transfer processing circuit from a power supply circuit, the data transfer processing circuit transferring data through data lines, and the power supply circuit being connected with the VBUS line when the data transfer control device operates as an A-device; and providing power to the data transfer processing circuit from the power supply circuit when the voltage of the VBUS line is detected to be equal to or smaller than a second threshold value in a state in which power is provided to the data transfer processing circuit from the VBUS line.

17. The power supply switching method as defined in claim 16, further comprising:

performing switching of a power source provided to the data transfer processing circuit from the power supply circuit to the VBUS line after a state transition of the B-device from an idle state to a peripheral state, and performing switching of a power source provided to the data transfer processing circuit from the VBUS line to the power supply circuit before a state transition of the B-device from the peripheral state to the idle state.

18. The power supply switching method as defined in claim 16, further comprising:

setting the first threshold value lower than the second threshold value.

19. The power supply switching method as defined in claim 16, wherein the second threshold value is higher than a session valid threshold value of the B-device and lower than a VBUS valid threshold value of the A-device.

20. A data transfer control device which controls data transfer of a second device, which transfers data to or from a first device through data lines and a power supply line and operates as a peripheral by using a self-power supply in a default state, the data transfer control device comprising:

a power supply circuit;

a power supply switch circuit which connects the power supply line with the power supply circuit;

a data transfer processing circuit which transfers data through the data lines; and a power supply switching circuit which provides power to the data transfer processing circuit from one of the power supply line and the power supply circuit based on a switching signal, wherein the power supply switching circuit provides power to the data transfer processing circuit from the power supply line when voltage of the power supply line is detected to be larger than a first threshold value in an idle state of the second device.

21. A data transfer control device which controls data transfer of a second device, which transfers data to or from a first device through data lines and a power supply line and operates as a peripheral by using a self-power supply in a default state, the data transfer control device comprising:

a power supply circuit;

a power supply switch circuit which connects the power supply line with the power supply circuit;

a data transfer processing circuit which transfers data through the data lines;

a power supply line voltage detection circuit which detects whether or not voltage of the power supply line is larger than a second threshold value; and a power supply switching circuit which provides power to the data transfer processing circuit from one of the power supply line and the power supply circuit based on a switching signal, wherein the power supply switching circuit provides power to the data transfer processing circuit from the power supply line when the voltage of the power supply line is detected to be larger than a first threshold value which is lower than the second threshold value, and provides power to the data transfer processing circuit from the power supply circuit when the voltage of the power supply line that has been larger than the second threshold value drops and then is detected to be equal to or smaller than the second threshold value.

* * * * *